(12) United States Patent
Lee et al.

(10) Patent No.: US 10,735,570 B2
(45) Date of Patent: Aug. 4, 2020

(54) MOBILE TERMINAL

(71) Applicant: LG ELECTRONICS INC., Seoul (KR)

(72) Inventors: Haklim Lee, Seoul (KR); Sanghyuk Im, Seoul (KR); Sunglyong Cha, Seoul (KR); Jongbeom Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/334,227

(22) PCT Filed: Sep. 28, 2016

(86) PCT No.: PCT/KR2016/010861
§ 371 (c)(1),
(2) Date: Mar. 18, 2019

(87) PCT Pub. No.: WO2018/062585
PCT Pub. Date: Apr. 5, 2018

(65) Prior Publication Data
US 2019/0387084 A1 Dec. 19, 2019

(51) Int. Cl.
*H04M 1/00* (2006.01)
*H04M 1/02* (2006.01)
*H04R 3/00* (2006.01)
*G06F 3/041* (2006.01)
*G06K 9/00* (2006.01)

(52) U.S. Cl.
CPC .......... *H04M 1/0266* (2013.01); *H04R 3/00* (2013.01); *G06F 3/041* (2013.01); *G06K 9/00013* (2013.01)

(58) Field of Classification Search
CPC ............ G06K 9/00013; H04M 1/0268; H04M 1/0266; H04M 1/6041; H04R 2499/11; H04R 3/00
See application file for complete search history.

(56) References Cited

U.S. PATENT DOCUMENTS

| | | | |
|---|---|---|---|
| 2012/0113614 A1* | 5/2012 | Watanabe | G02F 1/13336 361/810 |
| 2012/0206896 A1* | 8/2012 | Suzuki | G06F 1/1616 361/807 |

(Continued)

FOREIGN PATENT DOCUMENTS

| | | |
|---|---|---|
| CN | 201303355 Y | 9/2009 |
| CN | 102473363 A | 5/2012 |

(Continued)

*Primary Examiner* — Nhan T Le
(74) *Attorney, Agent, or Firm* — Birch, Stewart, Kolasch & Birch, LLP

(57) ABSTRACT

A mobile terminal is disclosed. The mobile terminal includes a first body including a first display; and a second body hinge-coupled to the first body, the second body including a second display, wherein the first display includes a first flat display and a first curved display positioned on a side of the first body and extended and curved from the first flat display, wherein the second display includes a second flat display and a second curved display positioned on a side of the second body and extended and curved from the second flat display, wherein at least a portion of the first and second curved displays is deactivated when an outer surface of the first curved display faces an outer surface of the second curved display.

15 Claims, 22 Drawing Sheets

(56) References Cited

U.S. PATENT DOCUMENTS

2013/0021266 A1    1/2013  Selim
2017/0237845 A1*   8/2017  Yoo .................... H04M 1/7253
                                                        455/557

FOREIGN PATENT DOCUMENTS

| CN | 105245938 A | 1/2016 |
| EP | 2 993 569 A1 | 3/2016 |
| JP | 2015-226204 A | 12/2015 |
| KR | 10-2012-0092035 A | 8/2012 |
| KR | 10-2013-0062210 A | 6/2013 |
| KR | 10-2015-0099677 A | 9/2015 |

* cited by examiner (a)

(b)

(c)

(d)

MOBILE TERMINAL

CROSS REFERENCE TO RELATED APPLICATIONS

This application is the National Phase of PCT/KR2016/010861 filed on Sep. 28, 2016, which is hereby expressly incorporated by reference into the present application.

TECHNICAL FIELD

The present disclosure relates to a mobile terminal. In particular, the present disclosure relates to a mobile terminal in which each area of a display is activated depending on an angle between both displays.

BACKGROUND ART

Terminals may be generally classified into mobile/portable terminals and stationary terminals based on a mobility. The mobile terminals may also be classified into handheld terminals and vehicle mounted terminals depending on whether or not a user can directly carry the terminal.

Mobile terminals have increasingly more functions. Examples of the functions include data and voice communications, taking pictures and videos with a camera, recording sound, playing music files using a speaker system, and displaying images and video on a display. Some mobile terminals include additional functionality which supports electronic game playing, while other terminals are configured as multimedia players. More recently, the mobile terminals have been configured to receive broadcast and multicast signals which permit viewing of contents such as videos and television programs.

As the mobile terminals have increasingly more functions, the mobile terminals have been implemented as multimedia players of multiple functions, such as taking pictures and video, playing music files or video, game playing, receiving broadcast, and the like.

To support and increase the functionality of the mobile terminals, improvements in structural components and/or software improvement of the mobile terminals may be considered. In particular, if the mobile terminal is a foldable terminal, improvements in a boundary area of both adjacent displays may be considered.

DISCLOSURE

Technical Problem

An object of the present disclosure is to address the above-described and other problems. Another object of the present disclosure is to provide a mobile terminal in which each area of a display is activated depending on an angle between both displays.

Technical Solution

To achieve the above-described and other objects, in one aspect of the present disclosure, there is provided a mobile terminal comprising a first body including a first display; and a second body hinge-coupled to the first body, the second body including a second display, wherein the first display includes a first flat display positioned on one surface of the first body, and a first curved display positioned on a side of the first body adjacent to a rotation axis of the first body and extended and curved from the first flat display, wherein the second display includes a second flat display positioned on one surface of the second body, and a second curved display positioned on a side of the second body adjacent to a rotation axis of the second body and extended and curved from the second flat display, wherein at least a portion of the first and second curved displays is deactivated when an outer surface of the first curved display faces an outer surface of the second curved display.

According to another aspect of the present disclosure, when the first and second curved displays form a valley, areas of the first and second curved displays adjacent to the valley may be in a deactivated state.

According to another aspect of the present disclosure, the mobile terminal may further comprise a hinge assembly hinge-coupled to the first body and the second body.

According to another aspect of the present disclosure, the first body may have a first axis coupled to the hinge assembly, the second body may have a second axis coupled to the hinge assembly, and the first axis may be parallel to the second axis.

According to another aspect of the present disclosure, the first axis and the second axis may be differently located in the hinge assembly depending on an angle formed between the first body and the second body.

According to another aspect of the present disclosure, the first curved display may include a first curved glass, a first semi-transparent deposition layer, and a first curved display panel that are sequentially stacked. The second curved display may include a second curved glass, a second semi-transparent deposition layer, and a second curved display panel that are sequentially stacked.

According to another aspect of the present disclosure, the mobile terminal may further comprise a controller configured to determine activated areas of the first display and the second display depending on an angle formed between the first body and the second body.

According to another aspect of the present disclosure, when a rear surface of the first body faces a rear surface of the second body, the controller may activate at least one of the first flat display and the second flat display and activate entire areas of the first and second curved displays.

According to another aspect of the present disclosure, the first curved display may include a first front area that is in contact with the first flat display, a first rear area adjacent to the second curved display, and a first middle area between the first front area and the first rear area. The second curved display may include a second front area that is in contact with the second flat display, a second rear area adjacent to the first curved display, and a second middle area between the second front area and the second rear area.

According to another aspect of the present disclosure, when the first body and the second body are unfolded, the controller may activate the first and second flat displays, the first and second front areas, and the first and second middle areas and deactivate the first and second rear areas.

According to another aspect of the present disclosure, when the first flat display is observed at the second flat display, the controller may activate the first and second flat displays and the first and second front areas and deactivate the first and second rear areas and the first and second middle areas.

According to another aspect of the present disclosure, the mobile terminal may further comprise a first earphone jack disposed on one side of the first body; and a second earphone jack disposed on one side of the second body.

According to another aspect of the present disclosure, the mobile terminal may further comprise a controller configured to output a first content to the first display and the first earphone jack and output a second content to the second display and the second earphone jack.

According to another aspect of the present disclosure, the first content may include at least one of an audio file, a video file, a streaming, a message reception notification, a call reception notification, an email reception notification, a voice call, and a video call. The second content may include at least one of an audio file, a video file, and a streaming.

According to another aspect of the present disclosure, the first curved display may form one body with the first flat display, and the second curved display may form one body with the second flat display.

Advantageous Effects

Effects of a mobile terminal according to the present disclosure are described as follows.

According to at least one aspect of the present disclosure, the present disclosure can position displays on a front surface and a rear surface of a mobile terminal.

According to at least one aspect of the present disclosure, the present disclosure can differently deactivate respective areas of both displays adjacent to a boundary depending on an angle between the both displays.

According to at least one aspect of the present disclosure, the present disclosure can output both different contents.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

MODE FOR INVENTION

Figure 1:
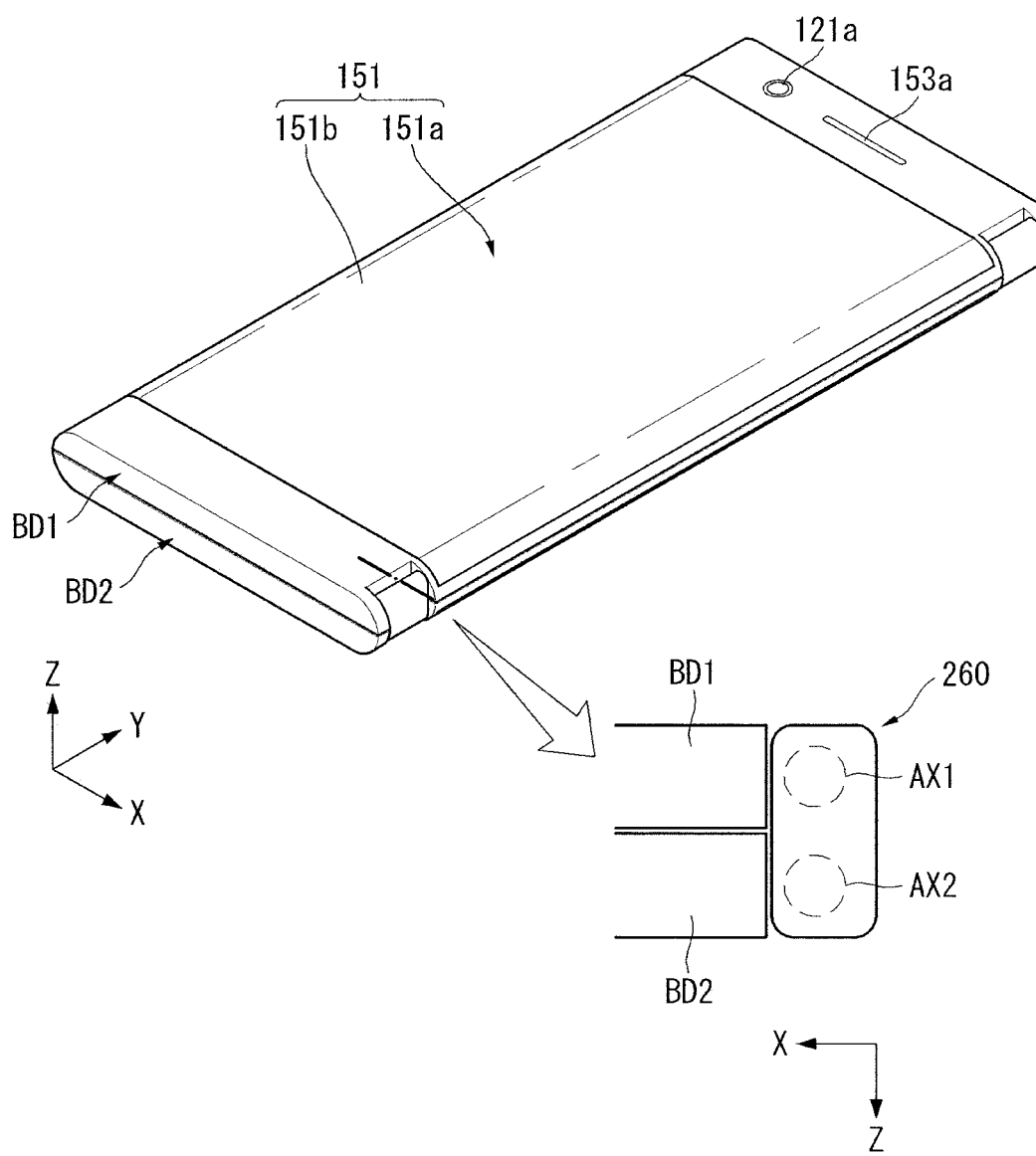
FIGS. 1 to 3 illustrate a mobile terminal according to an embodiment of the disclosure when viewed at various angles.

Reference will now be made in detail to embodiments of the disclosure, examples of which are illustrated in the accompanying drawings. Wherever possible, the same reference numbers will be used throughout the drawings to refer to the same or like parts.

In general, a suffix such as "module" and "unit" may be used to refer to elements or components. Use of such a suffix herein is merely intended to facilitate description of the specification, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When an arbitrary component is described as "being connected to" or "being coupled to" another component, this should be understood to mean that still another component(s) may exist between them, although the arbitrary component may be directly connected to or directly coupled to another component. In contrast, when an arbitrary component is described as "being directly connected to" or "being directly coupled to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

Mobile terminals disclosed herein may be implemented using a variety of different types of devices. Examples of such devices include cellular phones, smart phones, laptop computers, digital broadcast terminals, personal digital assistants (PDAs), portable multimedia players (PMPs), navigators, slate computers (PCs), tablet PCs, ultra books, wearable devices (for example, smart watches, smart glasses, head mounted displays (HMDs)), and the like.

By way of non-limiting example only, further description will be made with reference to particular types of mobile terminals. However, such teachings may be equally applied to other types of mobile terminals, such as those types noted above. In addition, these teachings may also be applied to stationary terminals such as digital TV, desktop computers, digital signage, and the like.

Figure 2:
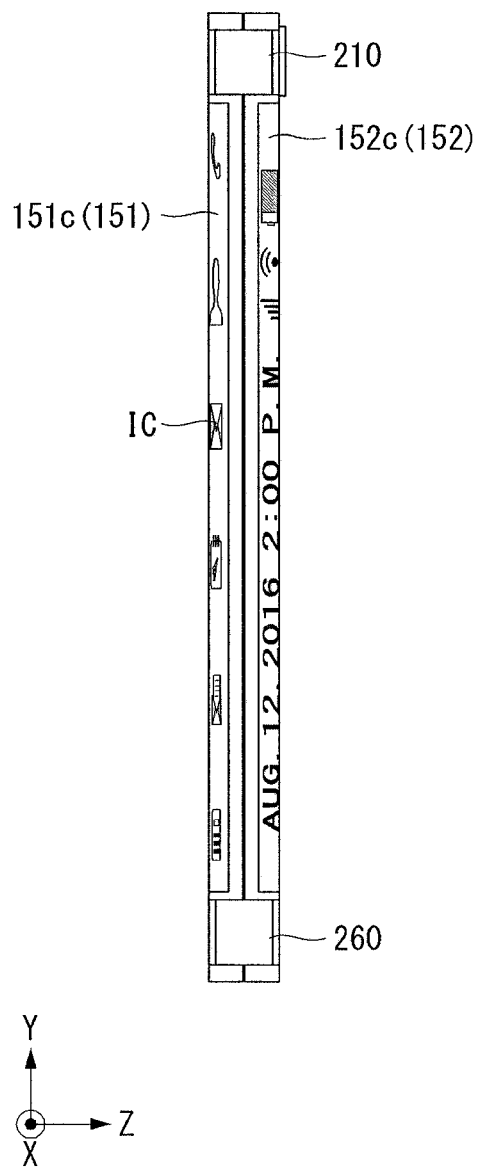
Figure 3:
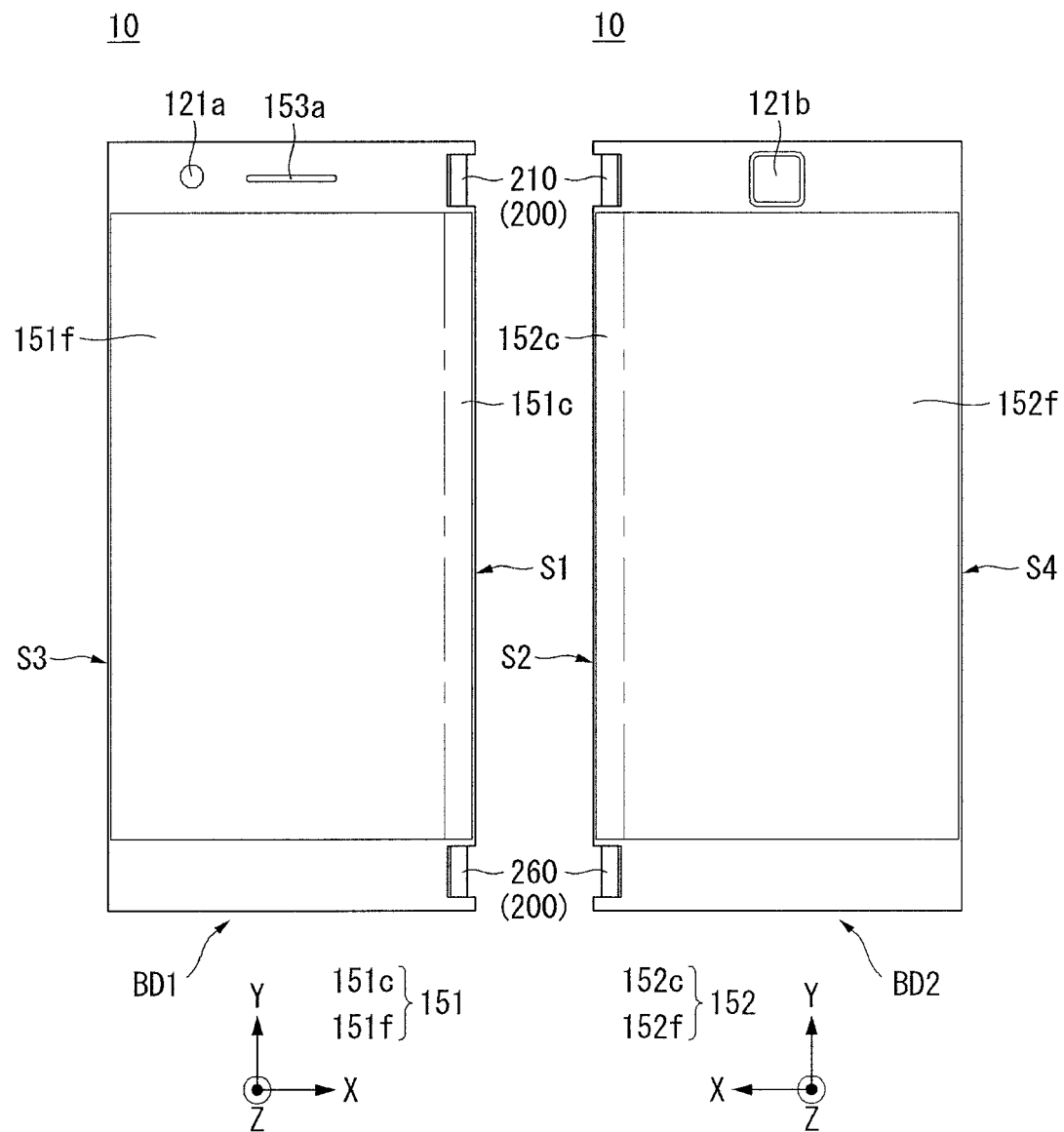

FIGS. 1 to 3 illustrate a mobile terminal according to an embodiment of the disclosure when viewed at various angles.

With reference to FIG. 1, a mobile terminal 10 according to an embodiment of the disclosure is shown. A first display 151 is positioned on a front surface of the mobile terminal 10. The first display 151 may be positioned on a front surface of a first body BD1. In FIG. 1, the front surface of the mobile terminal 10 may be construed as the front surface of the first body BD1, but may not be understood in an absolute direction.

The first display 151 may display an image and/or a video. The first display 151 may include a touch sensor to obtain a touch input. The first display 151 may include a fingerprint sensor to obtain fingerprint information in a specific area or an entire area.

The first display 151 may include a first glass 151a and a first display panel 151b. The first glass 151a may be positioned on the front surface of the first body BD1 and may form at least a portion of the front surface of the mobile terminal 10. The first display panel 151b may be positioned on a rear surface of the first glass 151a. The first display panel 151b may consist of, for example, an LCD or an OLED.

A first camera 121a may be positioned on the front surface of the mobile terminal 10. The first camera 121a may be positioned on the front surface of the first body BD1. The first camera 121a may obtain an image or a video. A first audio output unit 153a may be positioned on the front surface of the first body BD1. The first audio output section 153a can output sound. For example, the first audio output unit 153a may output a call tone, a message reception tone, or the like.

The first body BD1 and a second body BD2 may be connected at one side of the mobile terminal 10. The first body BD1 and the second body BD2 may be connected to a hinge assembly 260. For example, the first body BD1 and the second body BD2 may be hinge-coupled to the hinge assembly.

The first body BD1 may form a first axis AX1. The second body BD2 may form a second axis AX2. The first axis AX1 and the second axis AX2 may be parallel to each other. The first axis AX1 may be an axis about which the first body BD1 rotates with respect to the hinge assembly 260. The second axis AX2 may be an axis about which the second body BD2 rotates with respect to the hinge assembly 260. That is, relative positions of the first body BD1 and the second body BD2 may be changed by the hinge assembly 260. FIG. 1 illustrates a state in which the first body BD1 and the second body BD2 face each other. More specifically, FIG. 1 illustrates a state in which a rear surface of the first body BD1 faces a rear surface of the second body BD2.

With reference to FIG. 2, the side of the mobile terminal 10 is shown. The side of the mobile terminal 10 shown in FIG. 2 may be the side of the mobile terminal 10 in a state where the rear surface of the first body BD1 and the rear surface of the second body BD2 face each other.

The first display 151 may include a first curved display 151c. The first curved display 151c may be positioned between hinge assemblies 210 and 260. A second curved display 152c may be positioned on one side of the second body BD2 (see FIG. 1). The second curved display 152c may be adjacent to the first curved display 151c and may be positioned between the hinge assemblies 210 and 260.

The curved displays 151c and 152c can display at least one icon (IC). The curved displays 151c and 152c can display useful information to the user by maintaining an activation state. For example, the curved displays 151c and 152c can display time information, message reception information, call information, and the like. The curved displays 151c and 152c can display basic information of a system including time information. The curved displays 151c and 152c can display current time and the like. The curved displays 151c and 152c can display a reception sensitivity state of mobile communication, Wi-Fi connectivity, a remaining amount of a battery, and the like.

The curved displays 151c and 152c may be advantageous in terms of power resources of the mobile terminal 10. For example, the curved displays 151c and 152c may have relatively low power consumption because a display area of the curved displays 151c and 152c is relatively small.

With reference to FIG. 3, the front surface and a rear surface of the mobile terminal 10 are shown. The mobile terminal 10 shown in FIG. 3 may be in a state where the first body BD1 and the second body BD2 are folded. In the state where the first body BD1 and the second body BD2 are folded, the front surface and the rear surface of the mobile terminal 10 may be distinguished based on the first body BD1. That is, in FIG. 3, the front surface of the mobile terminal 10 may refer to a surface where the first body BD1 is seen from the front, and the rear surface of the mobile terminal 10 may refer to a surface where the second body BD2 is seen from the front.

A side of the first body BD1 adjacent to the hinge assemblies 210 and 260 may be referred to as a first side S1. A side of the first body BD1 that is spaced from the first side S1 may be referred to as a third side S3. A side of the second body BD2 adjacent to the hinge assemblies 210 and 260 may be referred to as a second side S2. A side of the second body BD2 that is spaced from the second side S2 may be referred to as a fourth side S4. A direction of the first side S1 or a direction of the second side S2 may be a longitudinal direction of the mobile terminal 10.

Although not shown, a case where the first body BD1 is directly hinge-coupled to the second body BD2 may be considered. In this case, the first side S1 may contact or overlap the second body BD2. In this case, the second side S2 may contact or overlap the first body BD1. Further, when the first body BD1 is directly hinge-coupled to the second body BD2, a rotation axis of the first body BD1 may be coaxial with a rotation axis of the second body BD2.

The first display 151 may include a first flat display 151f and the first curved display 151c. The first flat display 151f may be positioned on the front surface of the first body BD1. The first curved display 151c may be positioned adjacent to the first side S1. The first curved display 151c may extend from the first flat display 151f toward the first side S1. The first curved display 151c may have a curved shape. A curved direction of the first curved display 151c may be a direction toward the rear surface of the first body BD1. The first curved display 151c may be positioned between the upper hinge assembly 210 and the lower hinge assembly 260.

The second display 152 may include a second flat display 152f and the second curved display 152c. The second flat display 152f may be positioned on the front surface of the second body BD2. The second curved display 152c may be positioned adjacent to the second side S2. The second curved display 152c may extend from the second flat display 152f toward the second side S2. The second curved display 152c may have a curved shape. A curved direction of the second curved display 152c may be a direction toward the rear surface of the second body BD2. The second curved display 152c may be positioned between the upper hinge assembly 210 and the lower hinge assembly 260.

A second camera 121b may be positioned on the second body BD2. Although not shown, the second camera 121b may be a dual camera or a 3D camera.

Figure 4:
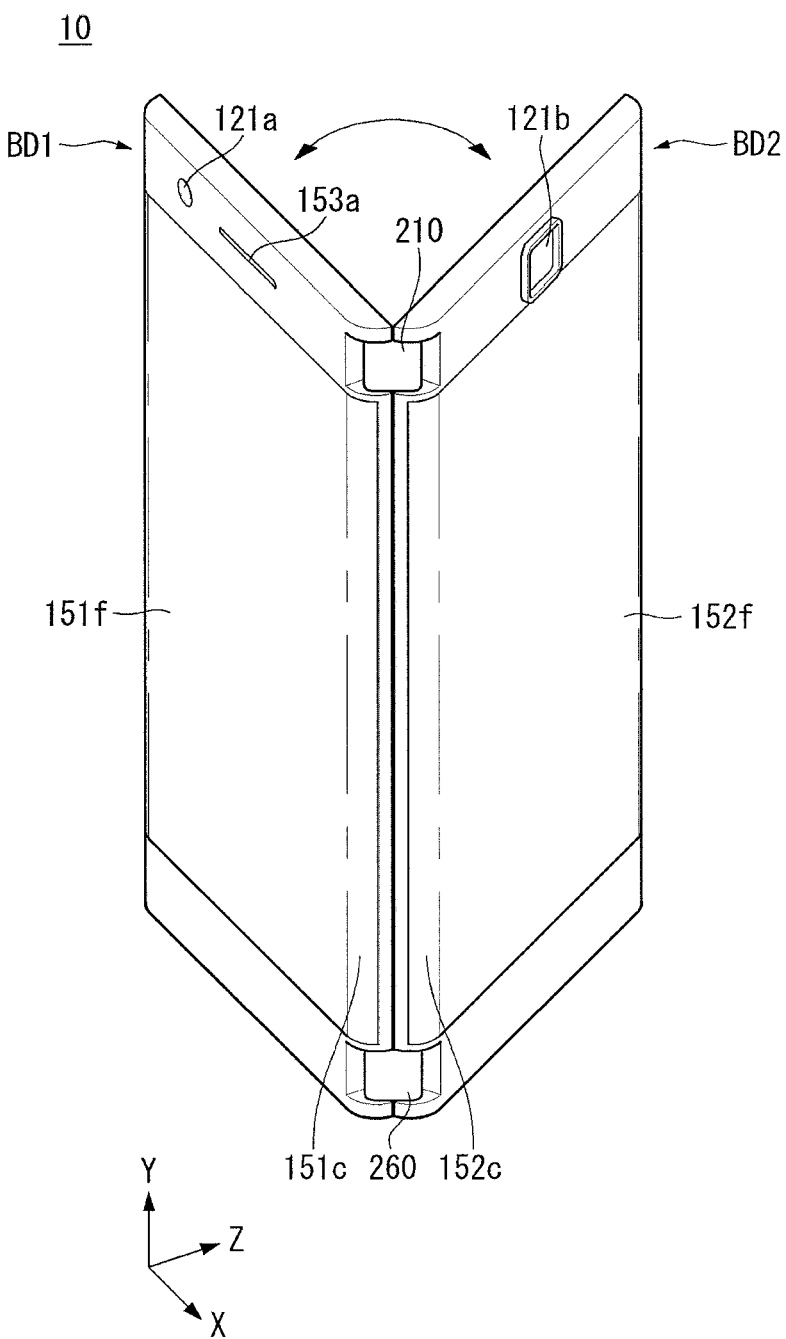
FIGS. 4 and 5 illustrate various states of a mobile terminal according to an embodiment of the disclosure.
Figure 5:
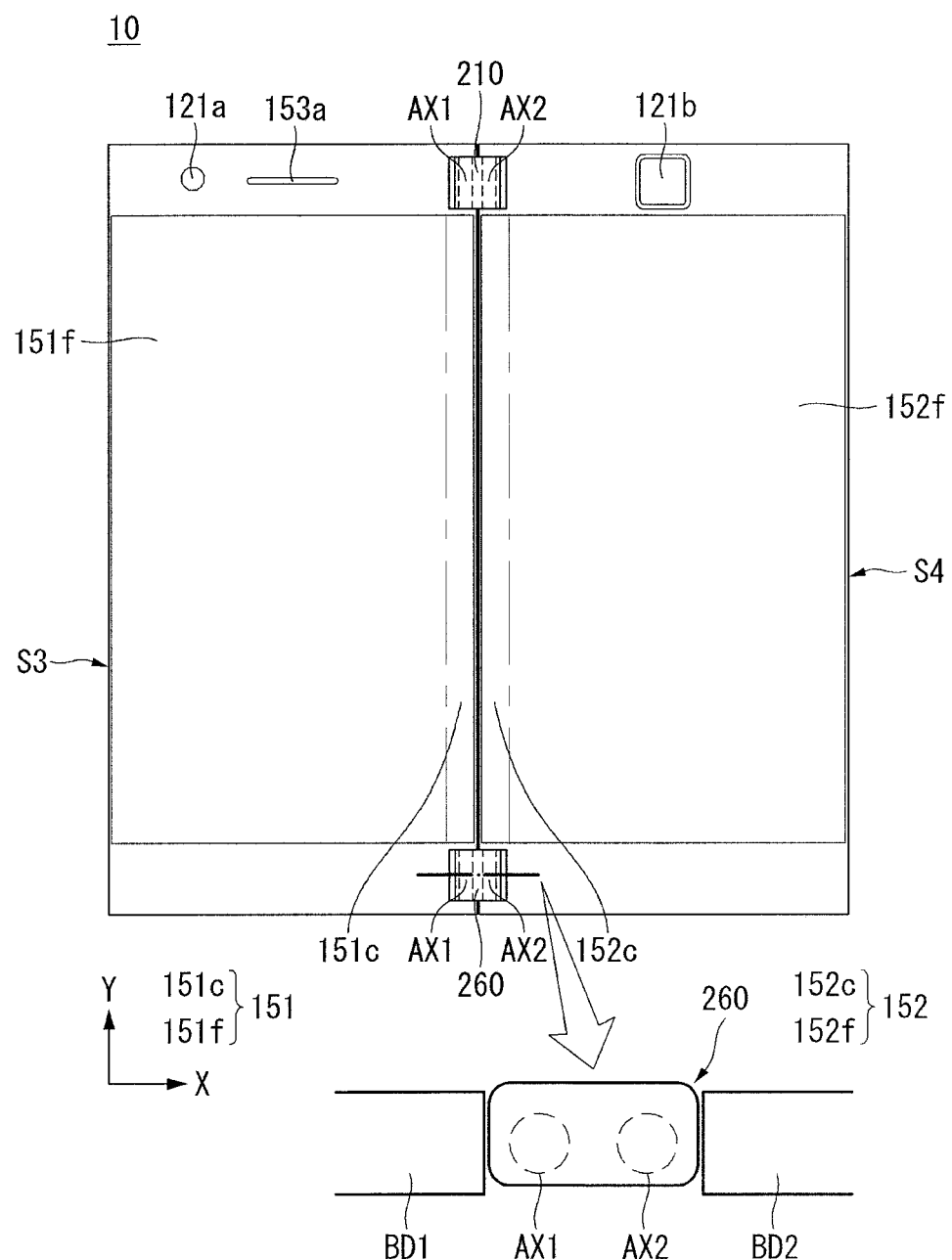

FIGS. 4 and 5 illustrate various states of a mobile terminal according to an embodiment of the disclosure.

Referring to FIG. 4, the mobile terminal 10 according to an embodiment of the disclosure may maintain a state where it is unfolded at a predetermined angle. That is, the rear surface of the first body BD1 and the rear surface of the second body BD2 may maintain a state where they are spaced from each other. In other words, the first body BD1 and the second body BD2 may rotate with respect to the hinge assemblies 210 and 260 and form an angle.

As shown in FIG. 4, the mobile terminal 10 may stand steadily. Since the first body BD1 and the second body BD2 can maintain a predetermined angle, they can secure a predetermined area for positioning the mobile terminal 10 on a bottom surface (not shown). The first display 151 and the second display 152 of the mobile terminal 10 can provide images or the like to different users in different directions.

Referring to FIG. 5, the first body BD1 and the second body BD2 may be positioned substantially on the same plane. Alternatively, the first flat display 151f and the second flat display 152f may be positioned substantially on the same plane. That is, the first flat display 151f and the second flat display 152f can output an image or a video in the same direction.

Since the first display 151 and the second display 152 are oriented in the same direction and are adjacent to each other, they may be recognized as one display. That is, the mobile terminal 10 of FIG. 5 according to an embodiment of the disclosure can provide a screen that is substantially two times larger than a size of a screen provided by only the first display 151 or the second display 152.

Figure 6:
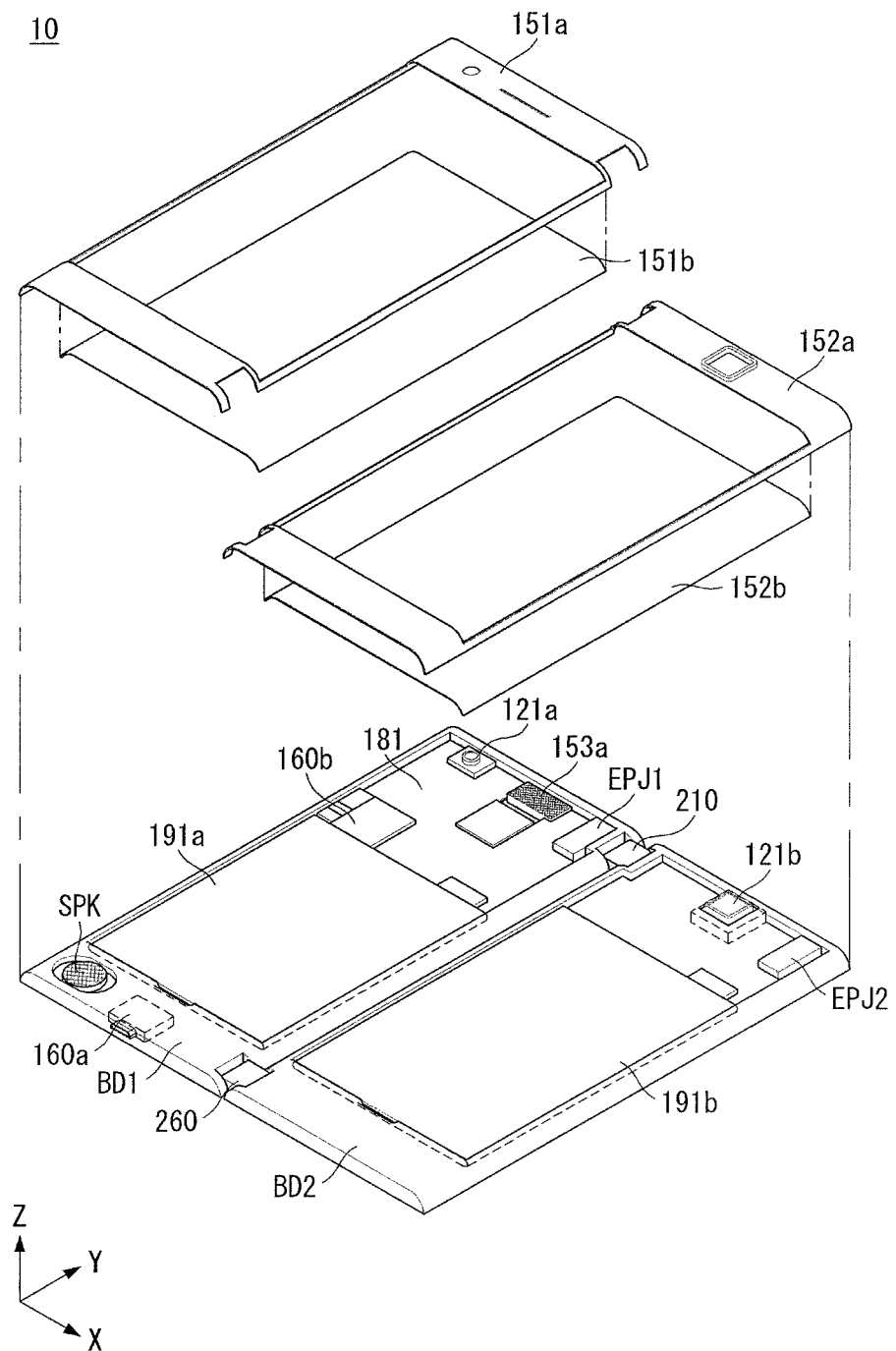
FIG. 6 is an exploded perspective view of a mobile terminal according to an embodiment of the disclosure.

FIG. 6 is an exploded perspective view of a mobile terminal according to an embodiment of the disclosure. Referring to FIG. 6, the first body BD1 and the second body BD2 may be hinge-coupled to the hinge assemblies 210 and 260 and may rotate with respect to the hinge assemblies 210 and 260. The first body BD1 and the second body BD2 may include an internal space and embed an electronic part therein.

Batteries 191a and 191b may be located inside the bodies BD1 and BD2. The batteries 191a and 191b may be provided in plural. For example, the first battery 191a may be located in the first body BD1, and the second battery 191b may be located in the second body BD2. The first battery 191a may be connected to a battery connector 192 and electrically connected to a main PCB 181.

An USB terminal 160a may be located on one side of the first body BD1. The USB terminal 160a may be electrically connected to the main PCB 181. The USB terminal 161a may be a path for data or electric signals to the outside.

A SIM tray 160b may be located on one side of the first body BD1. For example, the SIM tray 160b may be located on the side of the first body BD1. The SIM tray 160b may provide a space where SIM is located. The SIM tray 160b can electrically connect the SIM to the main PCB 181. The SIM tray 160b can access the first body BD1.

The first camera 121a may be disposed to face the front of the first body BD1. The second camera 121b may be disposed to face the front of the second body BD2. The first audio output section 153a may be disposed to provide sound toward the front of the first body BD1. A first earphone jack EPJ1 may be located on one side of the first body BD1. A second earphone jack EPJ2 may be located on one side of the second body BD2.

Figure 7:
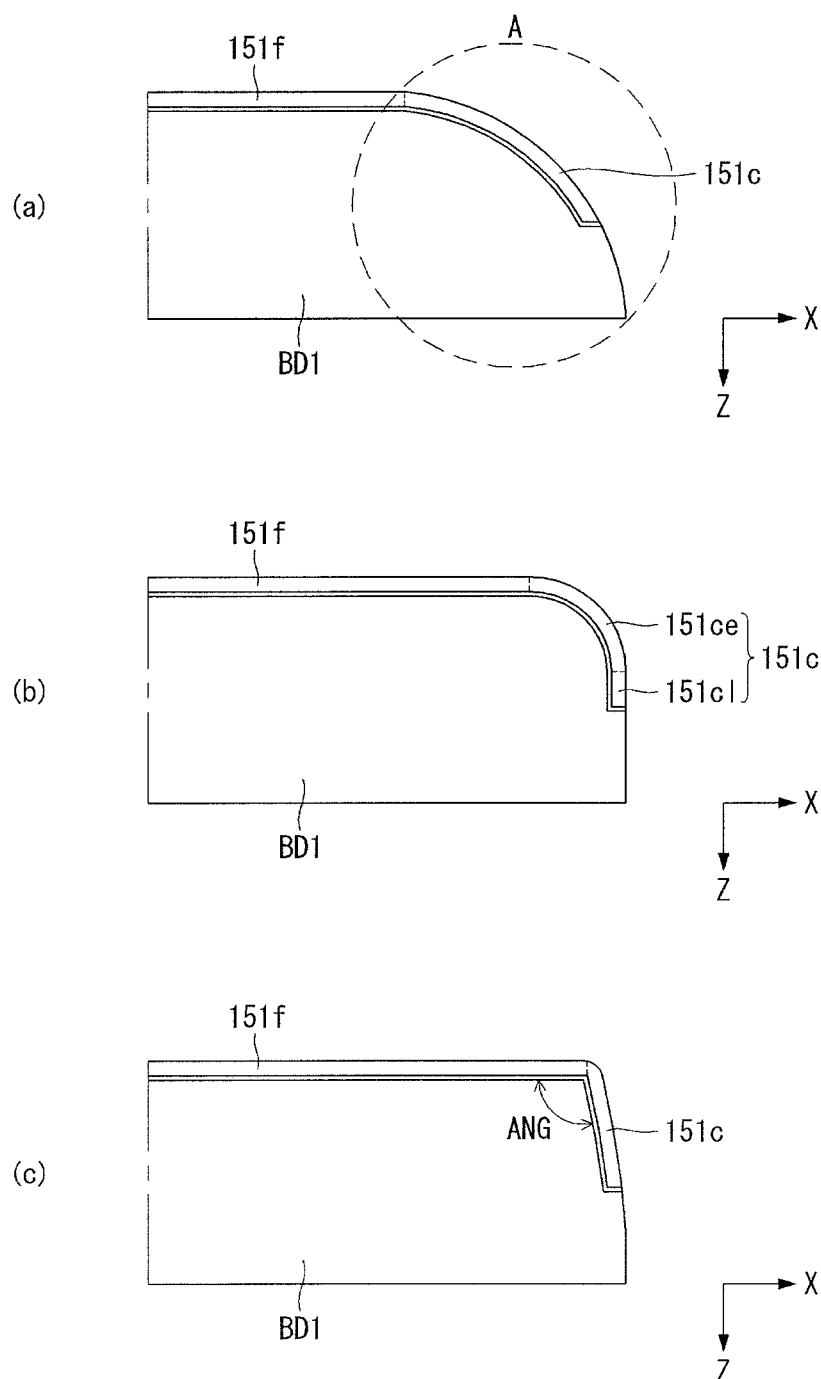
FIGS. 7 to 9 illustrate a display according to various embodiments of the disclosure.
Figure 8:
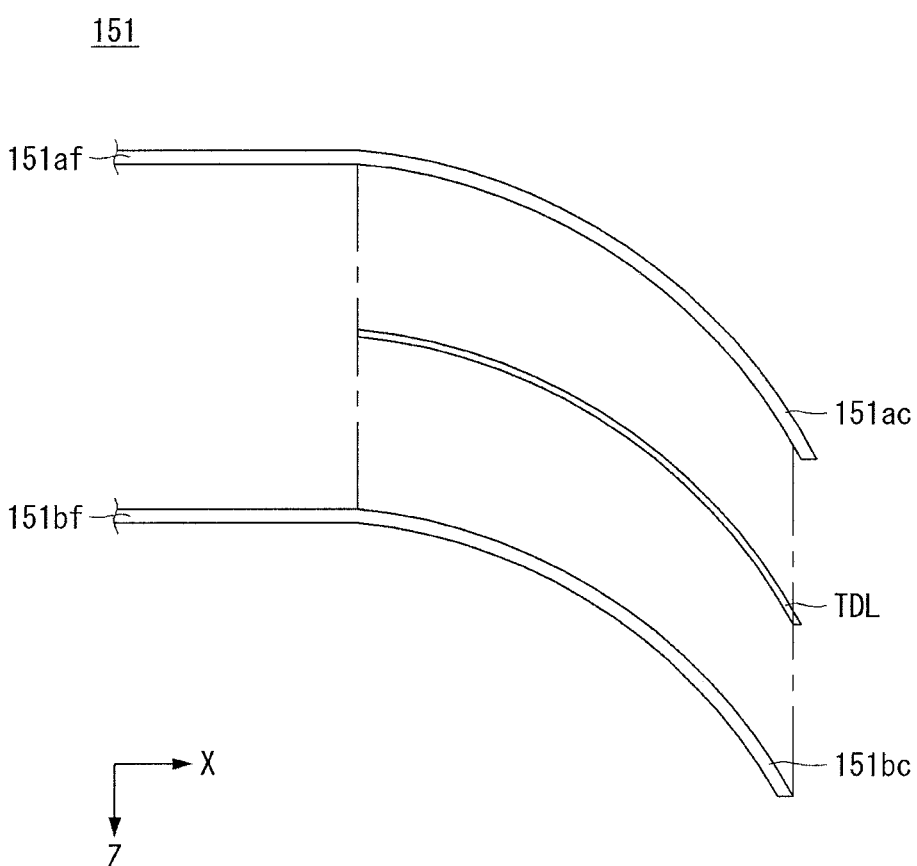
Figure 9:
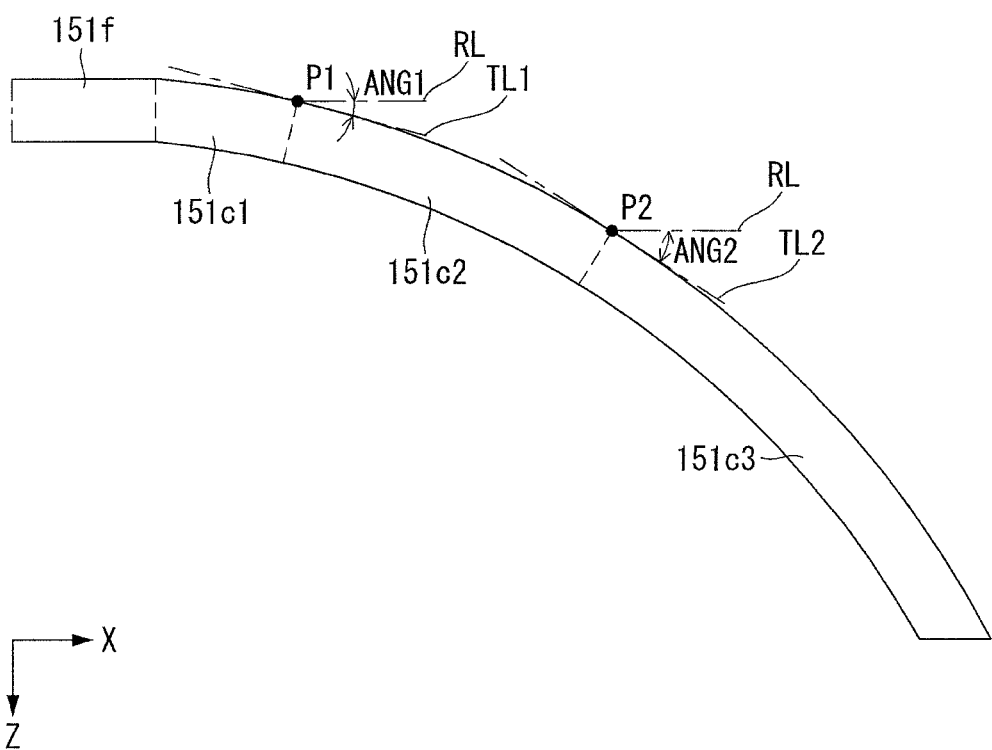

FIGS. 7 to 9 illustrate a display according to various embodiments of the disclosure. Although not shown in FIGS. 7 to 9, configuration of the second display 152 (see FIG. 3) may be substantially the same as various implementations of the first display 151. With reference to FIG. 7, a cross section of the first display 151 is observed.

Referring to (a) of FIG. 7, the first display 151 may be positioned on the front surface of the first body BD1. The first display 151 may be divided into a flat area and a curved area. For example, the first flat display 151f may correspond to the flat area of the first display 151. For example, the first curved display 151c may correspond to the curved area of the first display 151.

The first curved display 151c may be positioned adjacent to one side of the first body BD1. The first curved display 151c may form a portion of the side of the first body BD1. The first curved display 151c may be observed from the side of the first body BD1. The first curved display 151c may be positioned on the side of the first body BD1. The first curved display 151c may be adjacent to a rotation axis of the first body BD1. The first curved display 151c may be bent toward the rear surface of the first body BD1. The first curved display 151c may have a convex shape toward the outside.

Referring to (b) of FIG. 7, the first curved display 151c may include a linear area. For example, the first curved display 151c may include a first curved display linear portion 151c1. The first curved display linear portion 151c1 may be spaced from the first flat display 151f. The first curved display linear portion 151c1 may be directed toward the side of the first body BD1. As the first curved display linear portion 151c1 displays an image or a video toward the side of the first body BD1, the readability of an image or a video provided on the side of the first body BD1 can be improved.

The first curved display 151c may include a curved area. For example, the first curved display 151c may include a first curved display curved portion 151ce. The first curved display curved portion 151ce may be positioned between the first flat display 151f and the first curved display linear portion 151c1.

Referring to (c) of FIG. 7, the first curved display 151c may have on the whole a segment-shaped cross section. The first curved display 151c may form a specific angle ANG with the first flat display 151f. For example, the specific angle ANG may be 90 degrees. The first curved display 151c may be positioned on a different plane from the plane formed by the first flat display 151f. The first curved display 151c may be distinctly distinguished from the first flat display 151f. The first curved display 151c and the first flat display 151f may form an edge at a boundary between them.

With reference to FIG. 8, cross sections of first glasses 151af and 151ac and cross sections of first displays 151bf and 151bc are shown. Although not shown in FIG. 8, a structure of the second display 152 (see FIG. 3) may be substantially the same as the structure of the first display 151.

The first glasses 151af and 151ac may be stacked on rear surfaces of the first display panels 151bf and 151bc. The first glasses 151af and 151ac may be attached to the rear surfaces of the first display panels 151bf and 151bc. An OCA (not shown) may couple the first glasses 151af and 151ac to the first display panels 151bf and 151bc.

The first glasses 151af and 151ac may be divided into a first flat glass 151af and a first curved glass 151ac. The first display panels 151bf and 151bc may be divided into a first flat display panel 151bf and a first curved display panel 151bc.

The first flat glass 151af may correspond to the first flat display panel 151bf. The first curved glass 151ac may correspond to the first curved display panel 151bc. The first flat glass 151af may form one body with the first curved glass 151ac. The first flat display panel 151bf may form one body with the first curved display panel 151bc.

A semi-transparent deposition layer TDL may be positioned between the first curved display panel 151bc and the first curved glass 151ac. Since the first curved display panel 151bc has a curved or bent shape, the first curved display panel 151*bc* may include an area where distortion of the screen occurs based on a direction in which the first flat display panel 151*bf* is viewed from the front. The semi-transparent deposition layer TDL can suppress the distortion of the first curved display panel 151*bc* by increasing the reflection of the first curved glass 151*ac*.

With reference to FIG. 9, respective areas of the first display 151 according to an embodiment of the disclosure are shown. FIG. 9 illustrates an area "A" of FIG. 7(*a*). Although not shown, the second display 152 (see FIG. 3) can form areas corresponding to the respective areas of the first display 151.

The second flat display may correspond to the first flat display 151*f*. The second curved display may correspond to the first curved display 151*c*. A second front area of the second curved display may correspond to a first front area 151*c*1 of the first curved display 151*c*. A second middle area of the second curved display may correspond to a first middle area 151*c*2 of the first curved display 151*c*. A second rear area of the second curved display may correspond to a first rear area 151*c*3 of the first curved display 151*c*.

The first front area 151*c*1, the first middle area 151*c*2, and the first rear area 151*c*3 may be included in the first curved display 151*c*. The first front area 151*c*1 may be in contact with the first flat display 151*f*. The first front area 151*c*1 may be extended from the first flat display 151*f*.

The division between the first middle area 151*c*2 and the first front area 151*c*1 may be done by a first tangent angle ANG1 or a first point P1 of the first curved display 151*c*. A reference direction of the first tangent angle ANG1 may be a direction from the first flat display 151*f* to the first curved display 151*c*. A first tangent line TL1 may be tangential to the reference direction at the first point P1 of the first curved display 151*c*. A reference line RL may be directed from the first flat display 151*f* to the first curved display 151*c* and may be in parallel with the first flat display 151*f*.

The first tangent angle ANG1 may correspond to an angle formed by the first tangent line TL1 and the reference line RL. The first tangent angle ANG1 may be 15° to 20°. For example, the first tangent angle ANG1 may be 20 degrees. The first middle area 151*c*2 may be in contact with the first front area 151*c*1. The first middle area 151*c*2 may be extended from the first front area 151*c*1.

The division between the first rear area 151*c*3 and the first middle area 151*c*2 may be done by a second tangent angle ANG2 or a second point P2 of the first curved display 151*c*. A second tangent line TL2 may be tangential to a reference direction at the second point P2 of the first curved display 151*c*. The second tangent angle ANG2 may correspond to an angle formed by the second tangent line TL2 and a reference line RL. For example, the second tangent angle ANG2 may be 50 degrees. The first rear area 151*c*3 may be in contact with the first middle area 151*c*2. The first rear area 151*c*3 may be extended from the first middle area 151*c*2.

The characteristics of the respective areas 151*c*1, 151*c*2, and 151*c*3 of the first curved display 151*c* may be described based on a direction in which the first flat display 151*f* is viewed from the front.

The first front area 151*c*1 may be recognized or perceived as a substantially extended area of the first flat display 151*f*. The light may be clustered by external light sources as it goes from the first front area 151*c*1 to the first middle area 151*c*2.

The first middle area 151*c*2 may form an angle equal to or greater than a predetermined angle with the first flat display 151*f*. For example, the first middle area 151*c*2 may form an angle of 20° to 50° with the first flat display 151*f*.

In another example, the first middle area 151*c*2 may form an angle of 15° to 50° with the first flat display 151*f*. The first middle area 151*c*2 may be recognized or perceived as a curved surface. An image or a video displayed on the first middle area 151*c*2 may include distortion, but may be recognizable enough to be distinguished.

An angle formed by the first rear area 151*c*3 and the first flat display 151*f* may be greater than an angle formed by the first middle area 151*c*2 and the first flat display 151*f*. An image or a video displayed on the first rear area 151*c*3 may involve the distortion. The image or video displayed on the first rear area 151*c*3 may involve a color change. For example, the image or video displayed on the first rear area 151*c*3 may appear black. That is, the image or video displayed on the first rear area 151*c*3 may be seen without the distortion on the side of the first body BD1 (see FIG. 1), but may be seen in black from the front of the first body BD1 (see FIG. 1).

A controller (not shown) of the mobile terminal 10 according to an embodiment of the disclosure can control the activation of the first flat display 151*f* and the first curved display 151*c*. The controller (not shown) can control the activation of the respective areas 151*c*1, 151*c*2, and 151*c*3 of the first curved display 151*c*. Whether or not the respective areas 151*c*1, 151*c*2, and 151*c*3 of the first curved display 151*c* are activated may be determined depending on an angle between the first body BD1 (see FIG. 3) and the second body BD2 (see FIG. 3).

Figure 10:
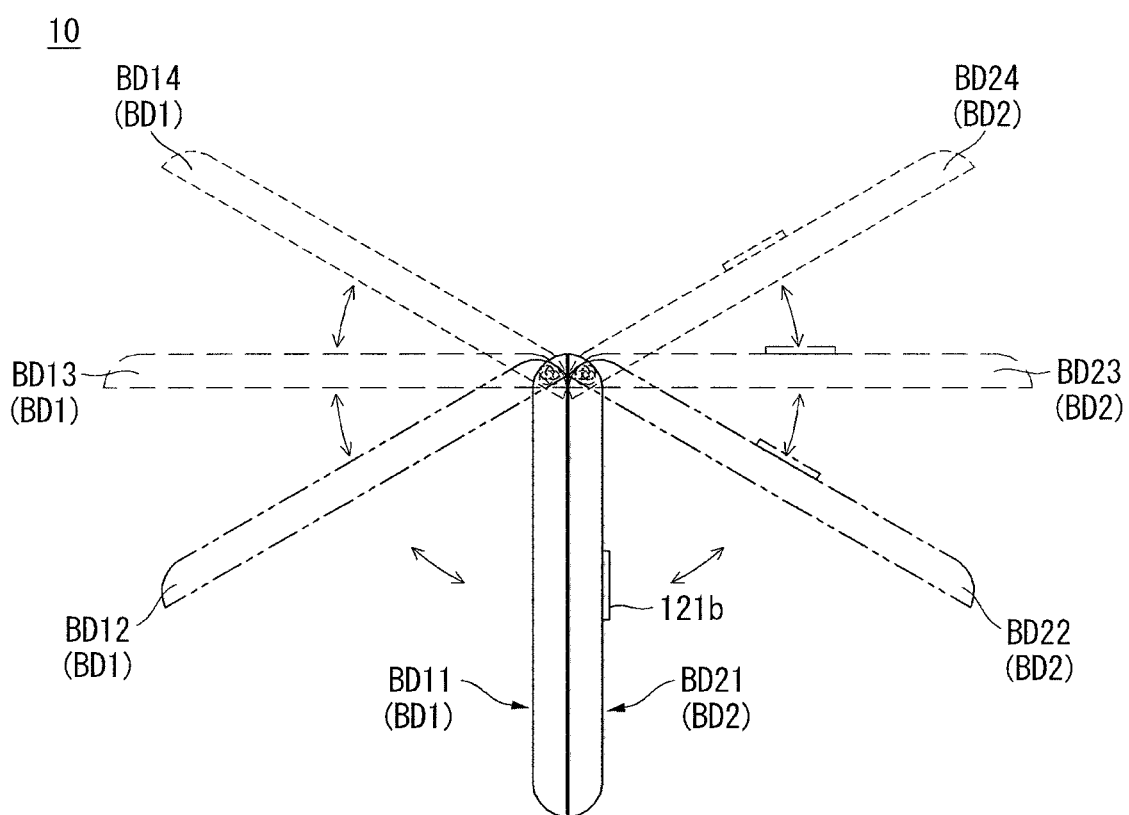
FIGS. 10 and 11 illustrate changes in an angle of a mobile terminal according to an embodiment of the disclosure.
Figure 11:
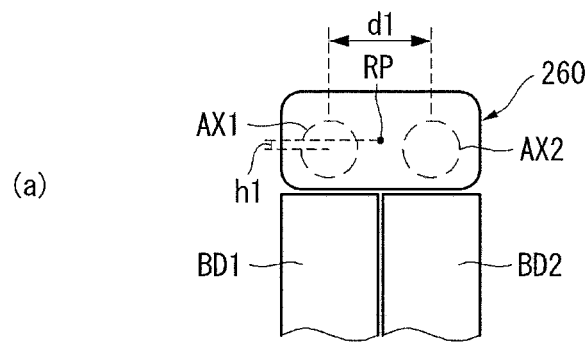
Figure 11:
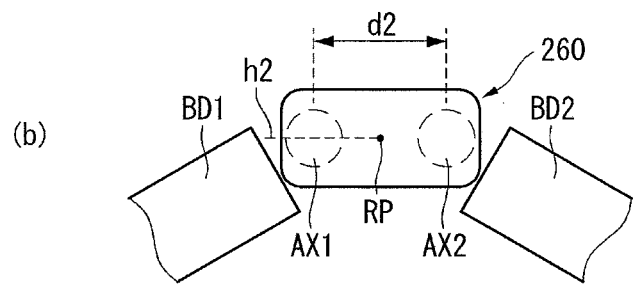
Figure 11:
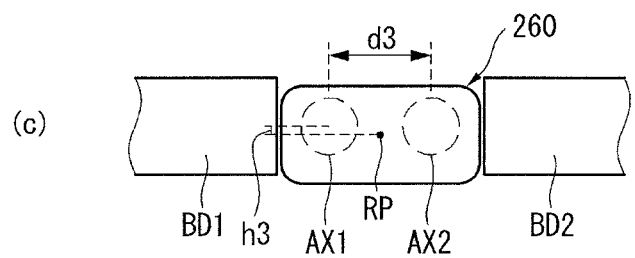
Figure 11:
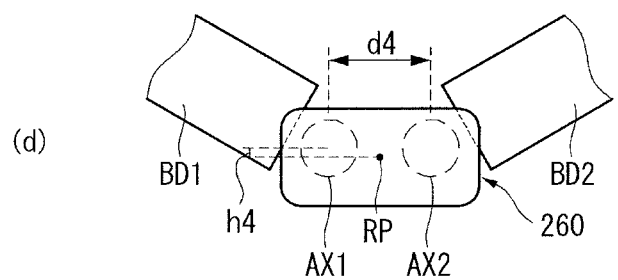

FIGS. 10 and 11 illustrate changes in an angle of a mobile terminal according to an embodiment of the disclosure.

Referring to FIG. 10, various states of the first body BD1 and the second body BD2 may appear. A state of the mobile terminal 10 may correspond to a state of the first body BD1 and the second body BD2. First bodies BD11, BD12, BD13 and BD14 may include a first body BD11 of a first state, a first body BD12 of a second state, a first body BD13 of a third state, and a first body BD14 of a fourth state. Second bodies BD21, BD22, BD23 and BD24 may include a second body BD21 of a first state, a second body BD22 of a second state, a second body BD23 of a third state, and a second body BD24 of a fourth state.

The first body BD1 and the second body BD2 may be the first body BD11 of the first state and the second body BD21 of the first state in a first state of the mobile terminal 10, respectively. That is, the first body BD1 and the second body BD2 may be in a state where they face each other. In the first state, an image or a video output by the first display 151 (see FIG. 3) positioned on a front surface of the first body BD11 and the second display 152 (see FIG. 3) positioned on a front surface of the second body BD21 may be recognized from the outside. The first state of the mobile terminal 10 may be referred to as a state where the mobile terminal 10 is folded.

The first body BD1 and the second body BD2 may rotate with respect to the hinge assembly 200. The hinge assembly 200 may be configured such that an angle at which the first body BD1 rotates is substantially equal to an angle at which the second body BD2 rotates. The first body BD11 and the second body BD21 may rotate about the hinge assembly 200 and may be the first body BD13 of the third state and the second body BD23 of the third state that are positioned on substantially the same plane, respectively. While the first body BD1 and the second body BD2 are changed from the first state to the third state, they may have different relative positions with respect to the hinge assembly 200.

The first body BD1 and the second body BD2 may be in the second state that is an intermediate state between the first state and the third state. The first body BD12 of the second state and the second body BD22 of the second state may form an angle of, for example, 90°.

The first body BD13 of the third state and the second body BD23 of the third state may rotate about the hinge assembly 200 and may be the first body BD14 of the fourth state and the second body BD24 of the fourth state, respectively. While the first body BD1 and the second body BD2 are changed from the third state to the fourth state, they may have uniform relative positions with respect to the hinge assembly 200. The mobile terminal 10 of the third state may provide the user with a similar feeling to the book.

With reference to FIG. 11, relative positions of the first body BD1 and the second body BD2 with respect to the hinge assembly 260 according to respective states of the first body BD1 and the second body BD2 are shown. The first body BD1 may include a first axis AX1. The first axis AX1 may be an axis about which the first body BD1 rotates in the hinge assembly 260. The second body BD2 may include a second axis AX2. The second axis AX2 may be an axis about which the second body BD2 rotates in the hinge assembly 260. The hinge assembly 260 may form a reference point RP. In FIG. 11, a reference direction may be a direction oriented from the hinge assembly 260 shown in (a) of FIG. 11 to the bodies BD1 and BD2.

Referring to (a) of FIG. 11, the first body BD1 and the second body BD2 may be in a first state. In the first state, the first axis AX1 may be spaced from the second axis AX2 by a first lateral distance d1. In the first state, the first axis AX1 and/or the second axis AX2 may be spaced from the reference point RP by a first longitudinal distance h1 in a longitudinal direction. That is, the first axis AX1 and the second axis AX2 may be positioned in front of the reference point RP in the reference direction. The longitudinal direction may be perpendicular to a direction connecting the first axis AX1 and the second axis AX2.

Referring to (b) of FIG. 11, the first body BD1 and the second body BD2 may be in a second state. The first axis AX1 may be spaced from the second axis AX2 by a second lateral distance d2. The first axis AX1 and/or the second axis AX2 may be spaced from the reference point RP by a second longitudinal distance h2 in the longitudinal direction. The second lateral distance d2 may be greater than the first lateral distance d1. The second longitudinal distance h2 may be less than the first longitudinal distance h1. For example, the second longitudinal distance h2 may be substantially zero.

Referring to (c) of FIG. 11, the first body BD1 and the second body BD2 may be in a third state. The first axis AX1 may be spaced from the second axis AX2 by a third lateral distance d3. The first axis AX1 and/or the second axis AX2 may be spaced from the reference point RP by a third longitudinal distance h3 in the longitudinal direction. The third lateral distance d3 may be less than the second lateral distance d2. The third longitudinal distance h3 may be greater than the second longitudinal distance h2. The first axis AX1 and the second axis AX2 may be behind the reference point RP in the reference direction.

Referring to (d) of FIG. 11, the first body BD1 and the second body BD2 may be in a fourth state. The first axis AX1 may be spaced from the second axis AX2 by a fourth lateral distance d4. The first axis AX1 and/or the second axis AX2 may be spaced from the reference point RP by a fourth longitudinal distance h4 in the longitudinal direction.

Referring to (c) and (d) of FIG. 11, the fourth lateral distance d4 may be equal to the third lateral distance d3, and the fourth longitudinal distance h4 may be equal to the third longitudinal distance h3. That is, while the mobile terminal 10 changes from the third state to the fourth state, relative positions of the first axis AX1 and the second axis AX2 with respect to the hinge assembly 200 may be uniform. This may be attributed to a cross-sectional shape of the curved displays 151c and 152c (see FIG. 5 and FIGS. 7 to 9) which are adjacent to each other. That is, in a process of changing the mobile terminal 10 from the third state to the fourth state, there may be no physical interference between the adjacent curved displays.

FIGS. 12 to 15 illustrate activation of a display depending on change in a state of a mobile terminal according to an embodiment of the disclosure.

Figure 12:
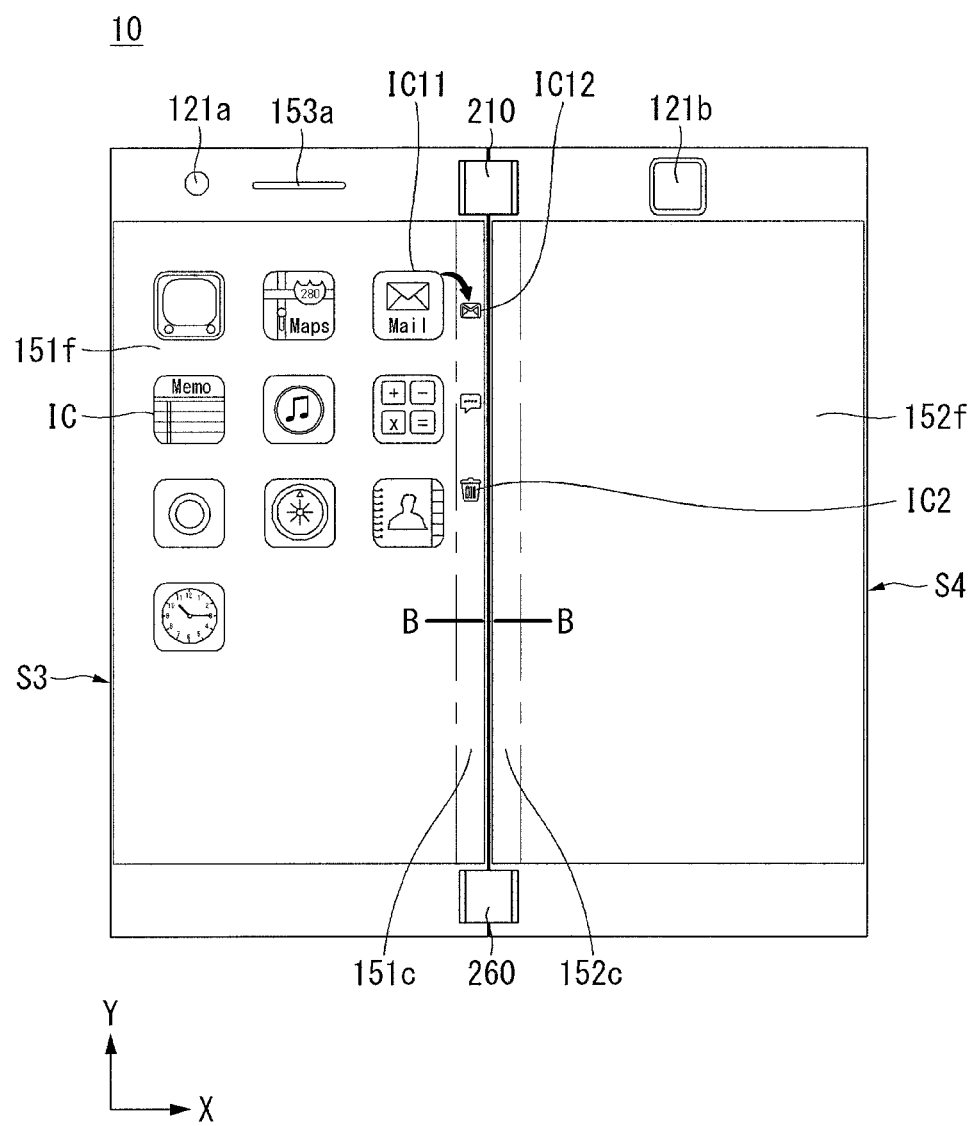
FIGS. 12 to 15 illustrate activation of a display depending on change in a state of a mobile terminal according to an embodiment of the disclosure.

Referring to FIG. 12, the mobile terminal 10 according to an embodiment of the disclosure may be, for example, in the second state. The first flat display 151f may display a plurality of icons on an initial screen. A first icon IC11 of the plurality of icons may be displayed on the first flat display 151f.

The first icon IC11 may be position-changed or copied from the first flat display 151f to the first curved display 151c by dragging or drag-and-drop. For example, the first icon IC11 may be copied to a first icon IC12 by dragging. The copied first icon IC12 may be linked to the same application as the first icon IC11. The first icon IC11 is copied to the first curved display 151c, and thus the curved displays 151c and 152c can provide a favorite function.

A second icon IC2 displayed on the curved displays 151c and 152c may perform a trash can function. For example, the first icon IC11 may move to a position of the second icon IC2 by dragging or the like. The first icon IC11 located adjacent to the second icon IC2 may be deleted. An item deleted by being dragged adjacent to the second icon IC2 may be a file in addition to the icon.

Figure 13:
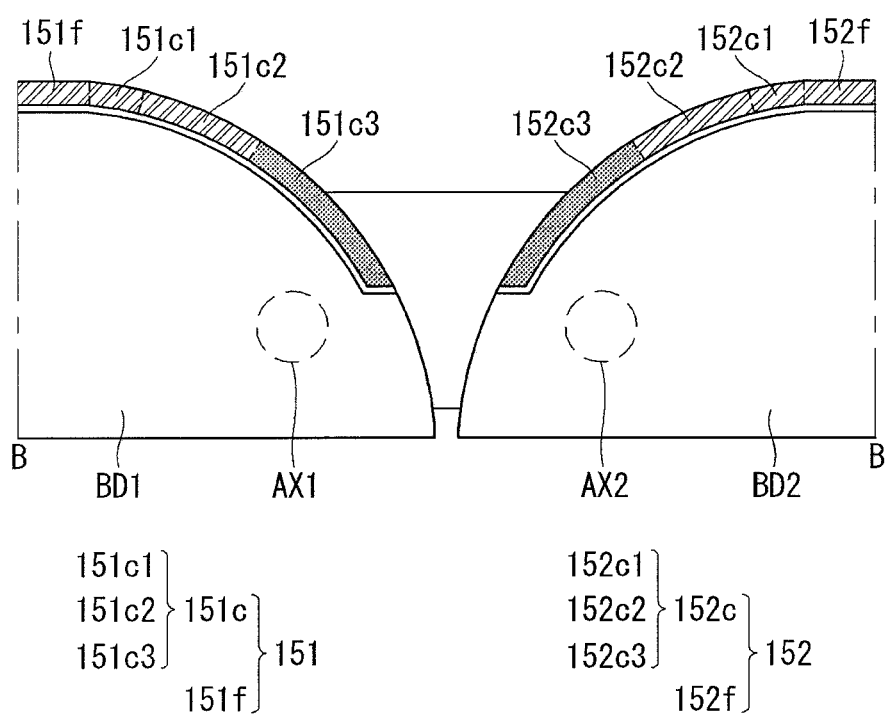

FIG. 13 illustrates a cross section of a mobile terminal according to an embodiment of the disclosure. FIG. 13 illustrates a cross section taken along line B-B of FIG. 12. FIG. 13 illustrates an activation state of the displays 151 and 152 in a third state. The activation of the mobile terminal according to an area of the displays 151 and 152 may depend on a state of the mobile terminal 10. In embodiments, the state of the mobile terminal 10 may mean a state where the mobile terminal 10 is folded or unfolded. The mobile terminal 10 may include a sensor (not shown) to measure the state of the mobile terminal 10. For example, the mobile terminal 10 may include an angle sensor (not shown).

Referring to FIG. 13, the first body BD1 and the second body BD2 may be in the third state. The first axis AX1 may be formed in the first body BD1. The second axis AX2 may be formed in the second body BD2.

Referring to FIG. 13, the first curved display 151c and the second curved display 152c may form a space. In other words, the first curved display 151c may be observed at the second curved display 152c, or the second curved display 152c may be observed at the first curved display 151c. Alternatively, an outer surface of the first curved display 151c may face an outer surface of the second curved display 152c.

Referring to FIG. 13, the space formed between the first curved display 151c and the second curved display 152c may be widened toward the flat displays 151f and 152f. In other words, the space between the first curved display 151c and the second curved display 152c may become narrower toward the rear surfaces of the bodies BD1 and BD2. Thus, the space between the first curved display 151c and the second curved display 152c may have a valley shape or a notch shape.

Referring to FIG. 13, in the third state, the flat displays 151f and 152f may be activated. In the third state, the front areas 151c1 and 152c1 and the middle areas 151c2 and 152c2 of the curved displays 151c and 152c may be activated. In the third state, the rear areas 151c3 and 152c3 of the curved displays 151c and 152c may be deactivated. Whether or not the displays 151 and 152 are activated may be determined by the controller (not shown).

In the third state, the flat displays 151f and 152f may be main displays. That is, an image or a video displayed on the flat displays 151f and 152f may provide the user with more information than an image or a video displayed on the curved displays 151c and 152c. Thus, a user's eye direction toward the displays 151 and 152 in the third state may be a direction toward the front of the flat displays 151f and 152f. Based on the direction toward the front of the flat displays 151f and 152f, an image or a video provided by the rear areas 151c3 and 152c3 of the curved displays 151c and 152c may be accompanied by severe distortion. The controller (not shown) can prevent visually distorted information from being displayed by deactivating the rear areas 151c3 and 152c3 of the curved displays 151c and 152c in the third state.

In an embodiment of the disclosure, the flat displays 151f and 152f may have a flat shape, and the curved displays 151c and 152c may have a curved shape. The flat displays 151f and 152f may be regarded as flat displays compared to the curved displays 151c and 152c. That is, it can be understood that the flat displays 151f and 152f and the curved displays 151c and 152c are distinguished from each other by a relative difference in a bending degree. For example, even if the flat displays 151f and 152f are curved, a bending degree of the flat displays 151f and 152f may be less than a bending degree of the curved displays 151c and 152c.

Figure 14:
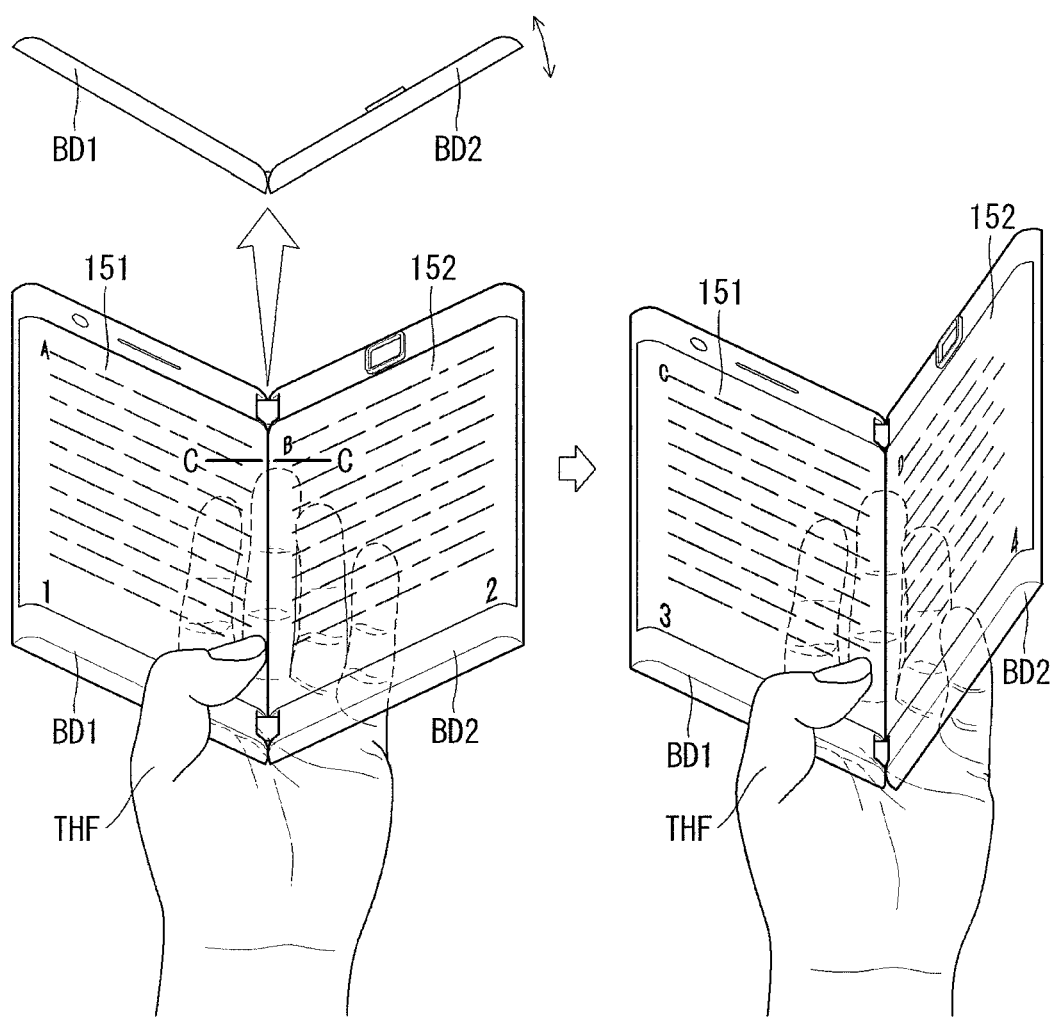

Referring to FIG. 14, the mobile terminal 10 according to an embodiment of the disclosure may be, for example, in a fourth state.

In the fourth state, a shape of the mobile terminal 10 may be similar to a shape of an opened book. Referring to FIG. 14, for example, a user's thumb THF may be positioned between the front surfaces of the first body BD1 and the second body BD2, and remaining fingers may be positioned between the rear surfaces of the first body BD1 and the second body BD2.

Referring to FIG. 14, the mobile terminal 10 according to an embodiment of the disclosure can provide contents such as documents, magazines, and novels through the displays 151 and 152. Although not shown, the user can receive content of the next page through a touch drag as if he or she turns over a book. As a method of providing the content of the next page, a method of using change in a state of the mobile terminal 10 may be considered.

In embodiments, change in the state of the mobile terminal 10 may mean change in a relative position of the first body BD1 and the second body BD2. For example, referring to FIG. 14, if the first body BD1 and the second body BD2 are folded and unfolded again by the user's thumb THF, etc. in a state where the displays 151 and 152 display first and second pages of the content, the controller (not shown) may display a third page and a fourth page of the content on the displays 151 and 152. In embodiments, an angle at which the first body BD1 and the second body BD2 are folded and unfolded again may be small.

Figure 15:
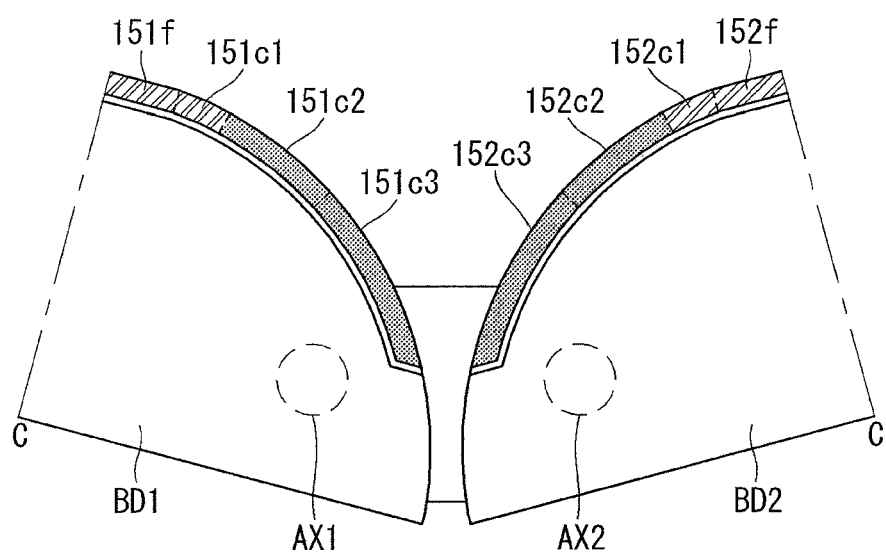

FIG. 15 illustrates a cross section of a mobile terminal according to an embodiment of the disclosure. FIG. 15 illustrates a cross section taken along line C-C of FIG. 14. FIG. 15 illustrates an activation state of the displays 151 and 152 in a fourth state.

Referring to FIG. 15, the first body BD1 and the second body BD2 may be in the fourth state. The first axis AX1 may be formed in the first body BD1. The second axis AX2 may be formed in the second body BD2. In the fourth state, the first flat display 151f may be observed at the second flat display 152f, or the second flat display 152f may be observed at the first flat display 151f.

Referring to FIG. 15, in the third state, the flat displays 151f and 152f and the front areas 151c1 and 152c1 may be activated. In the third state, the middle areas 151c2 and 152c2 and the rear areas 151c3 and 152c3 may be deactivated. Whether respective areas of the displays 151 and 152 are activated may be determined by the controller (not shown).

Based on a direction in which the flat displays 151f and 152f are viewed, an image or a video provided by the middle areas 151c2 and 152c2 and the rear areas 151c3 and 152c3 may be accompanied by severe distortion. The controller (not shown) can prevent the visually distorted image or video from being displayed by deactivating the middle areas 151c2 and 152c2 and the rear areas 151c3 and 152c3 in the fourth state.

Figure 16:
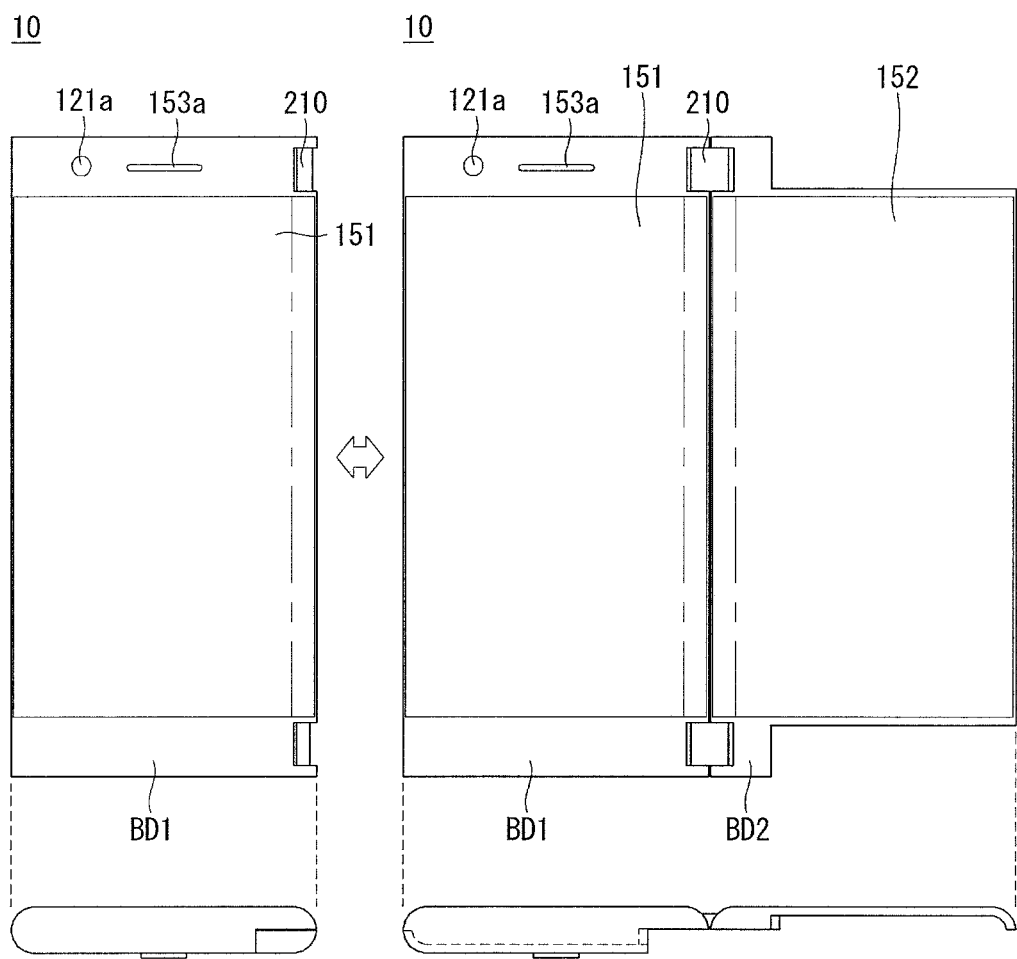
FIGS. 16 and 17 illustrate a mobile terminal according to another embodiment of the disclosure.
Figure 17:
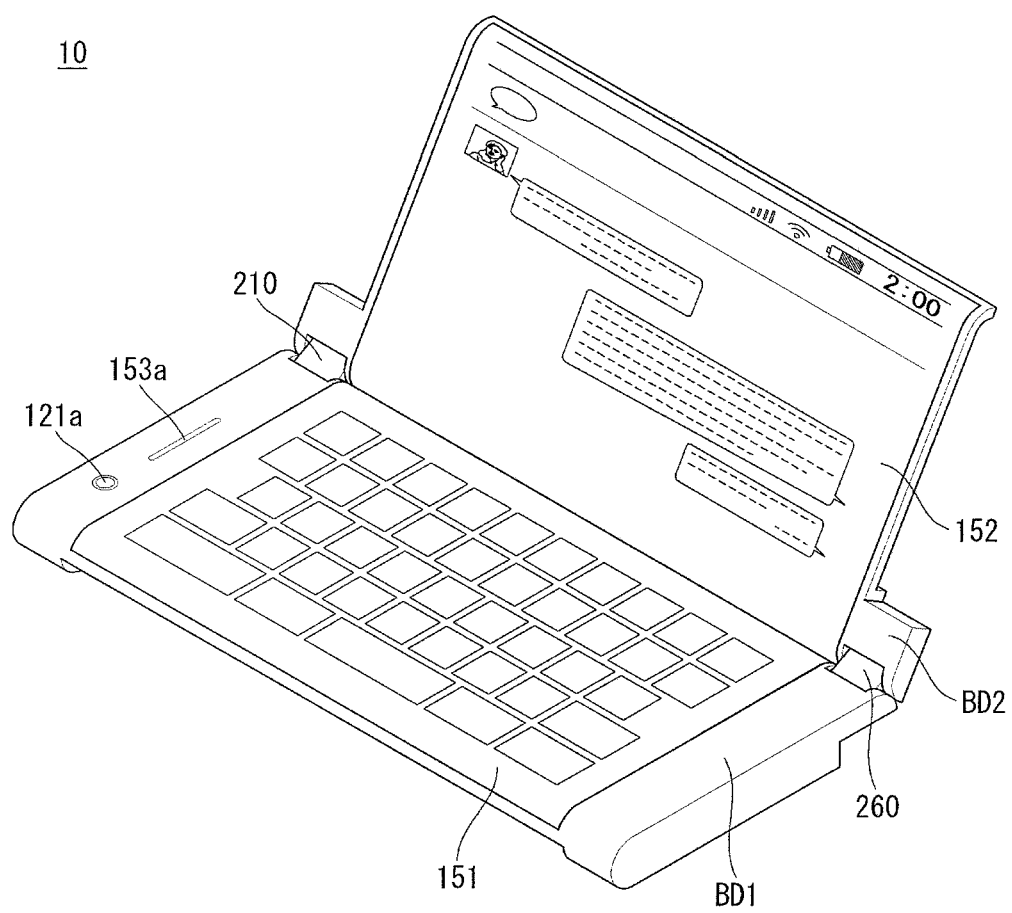

FIGS. 16 and 17 illustrate a mobile terminal according to another embodiment of the disclosure.

Referring to FIG. 16, the second display 152 may be positioned on the front surface of the second body BD2. The second body BD2 may not provide an internal space. That is, the second body BD2 may have on the whole a plate shape. The second body BD2 may not consume a space for forming the internal space. Thus, a thickness of the mobile terminal 10 can be reduced. The second body BD2 may be lighter than the first body BD1.

Referring to FIG. 17, the second display 152 may display content or a chat window, and the first display 151 may receive a user input. That is, the mobile terminal 10 may provide UX or UI of a laptop to the user.

In particular, in case of a mobile terminal 10 according to another embodiment of the disclosure, a second body BD2 may be lighter than a first body BD1. Thus, when the first body BD1 is positioned on the bottom surface (not shown), the mobile terminal 10 can be stably positioned. An inclination of a second display 152 can be adjusted by hinge assemblies 210 and 260.

FIGS. 18 to 21 illustrate various examples of using a mobile terminal according to an embodiment of the disclosure.

Figure 18:
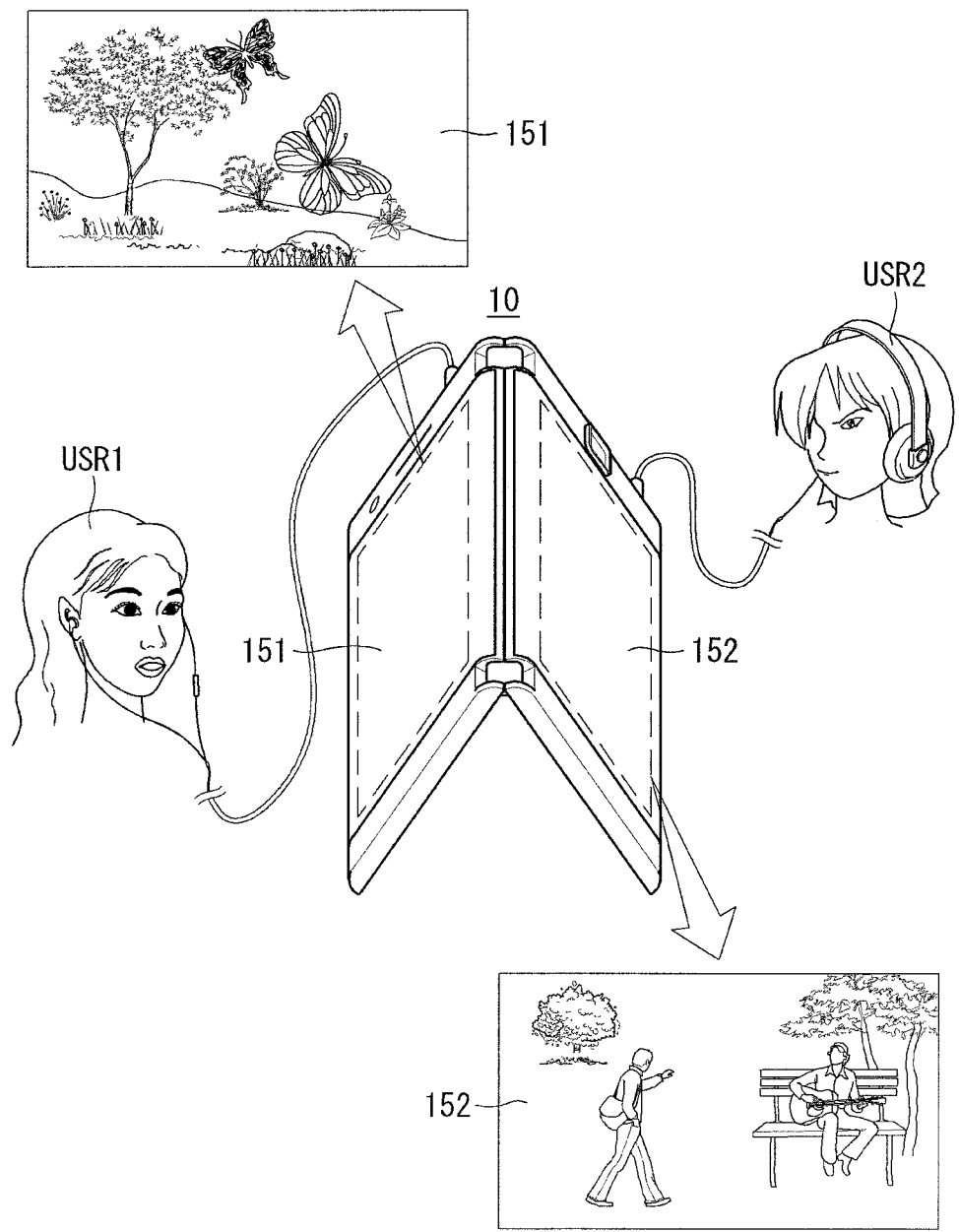
FIGS. 18 to 21 illustrate various examples of using a mobile terminal according to an embodiment of the disclosure.

Referring to FIG. 18, the first body BD1 and the second body BD2 may be in an unfolded state at a predetermined angle. The first body BD1 and the second body BD2 can be stably positioned on the bottom surface (not shown) by maintaining a predetermined angle. In this state, the first display 151 and the second display 152 may be oriented in different directions.

The controller (not shown) may output a first content to the first display 151 and the first earphone jack EPJ1 (see FIG. 6). The controller (not shown) may output a second content to the second display 152 and the second earphone jack EPJ2 (see FIG. 6). In FIG. 18, the controller may provide sound through the earphone jacks EPJ1 and EPJ2 (see FIG. 6), but embodiments are not limited thereto. For example, the controller may provide an audio signal in a Bluetooth manner.

Referring to FIG. 18, a first user USR1 may be provided with the first content. A second user USR2 may be provided with the second content. The mobile terminal 10 according to an embodiment of the disclosure can simultaneously provide the first and second contents which are the same as or different from each other.

Figure 19:
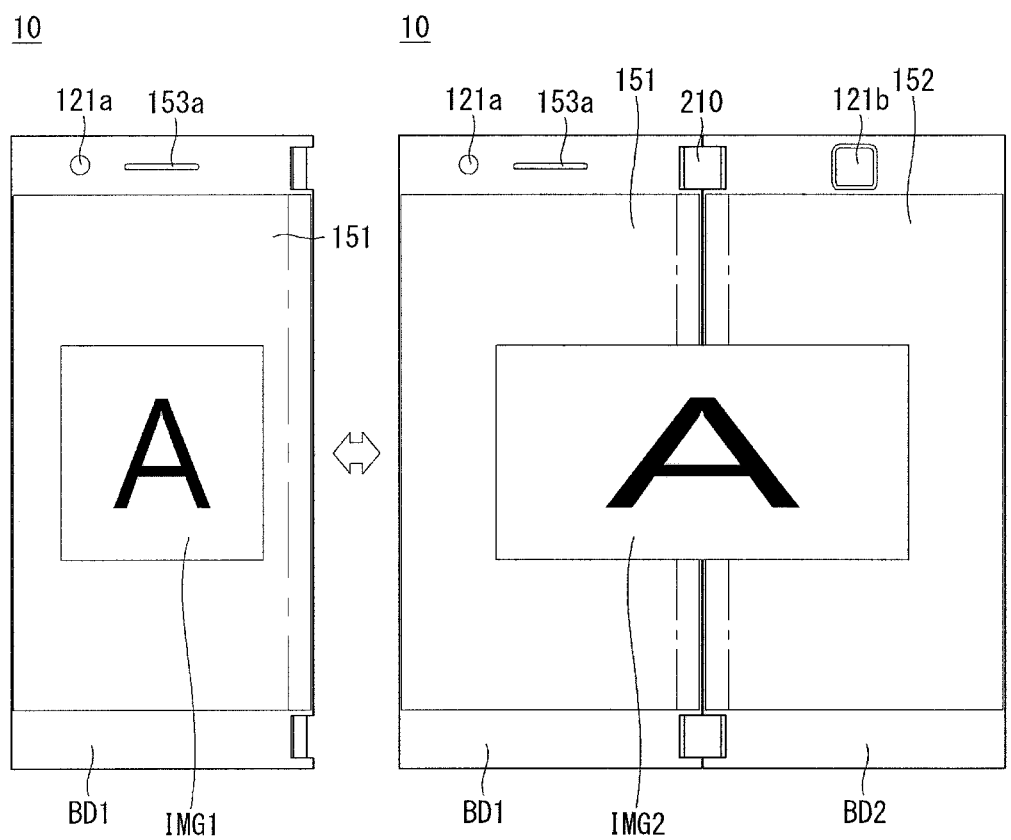

Referring to FIG. 19, in the first state, the first display 151 may display a first image IMG1. In FIG. 19, contents displayed on the displays 151 and 152 may correspond to contents such as images, videos, or documents.

When the mobile terminal 10 is changed from the first state to the second state in a state where the first display 151 displays the first image IMG1, the first display 151 and the second display 152 may display a second image IMG2. The second image IMG2 has the same content as the first image IMG1, but may be different from the first image IMG1 in terms of an aspect ratio.

Referring to FIG. 19, when the mobile terminal 10 is changed from the first state to the third state, the first image IMG1 may be changed to the second image IMG2. For example, the second image IMG2 may have a width greater than the first image IMG1. The second image IMG2 can have an advantage over the first image IMG1 in displaying a paranoid picture or an image.

Figure 20:
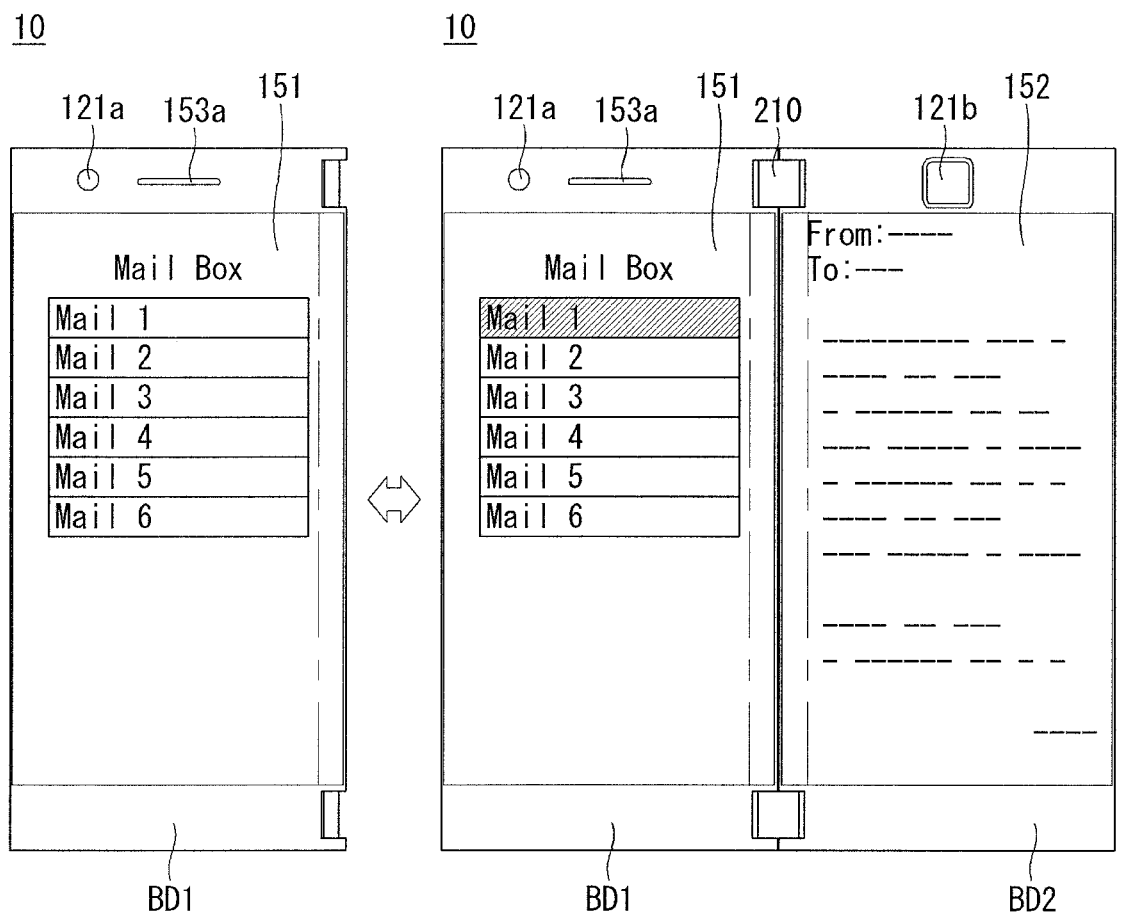

Referring to FIG. 20, in the first state, the first display 151 may display a mailbox. The first display 151 may display a mail list filled in the mailbox. A first mail in the mail list may be selected as a default.

When the mobile terminal 10 changes its state from the first state to the third state, the controller (not shown) may display contents of the first mail selected as the default in the mail list. If the user selects another mail on the first display 151, the controller (not shown) may display contents of the selected mail on the second display 152.

Figure 21:
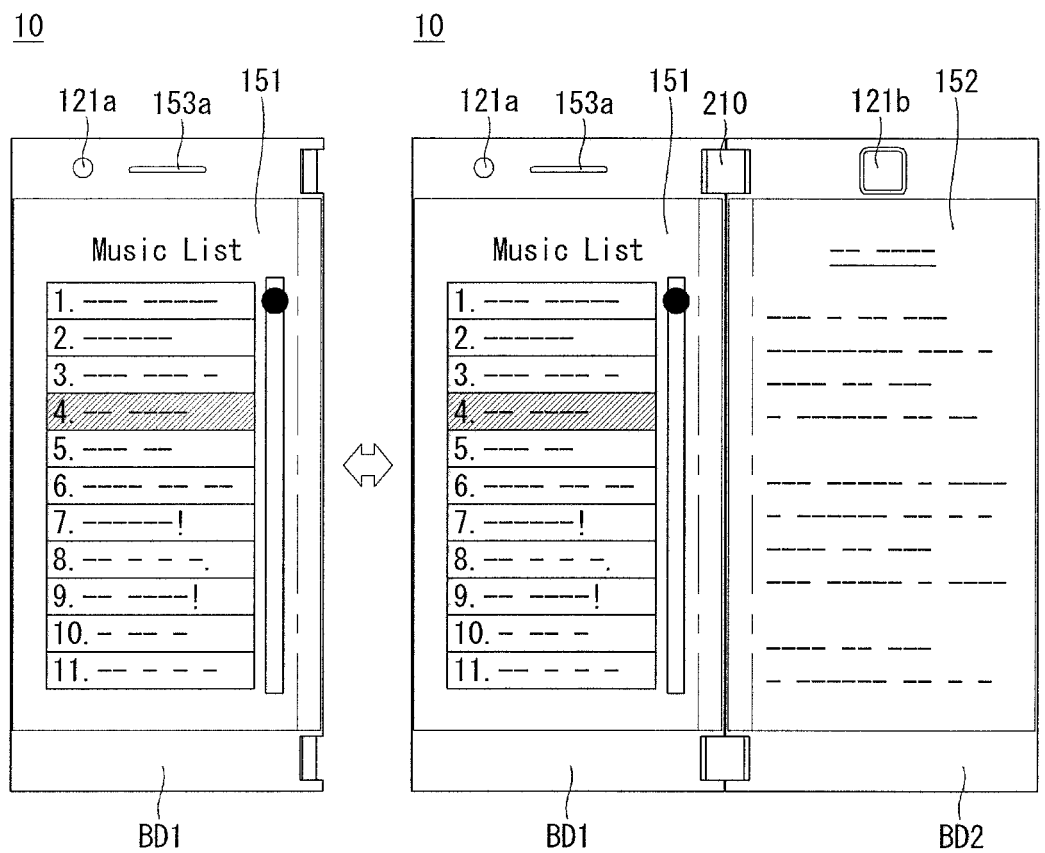

Referring to FIG. 21, in the first state, the controller (not shown) may output an audio signal and output a music list to the first display 151. For example, when a fourth song of the music list is selected, the controller (not shown) may display the selected music on the first display 151 and output an audio signal of the selected song.

When the mobile terminal 10 is changed from the first state to the third state, the second display 152 may display information related to the output sound. For example, the second display 152 may display lyrics information of the fourth song to be output.

Figure 22:
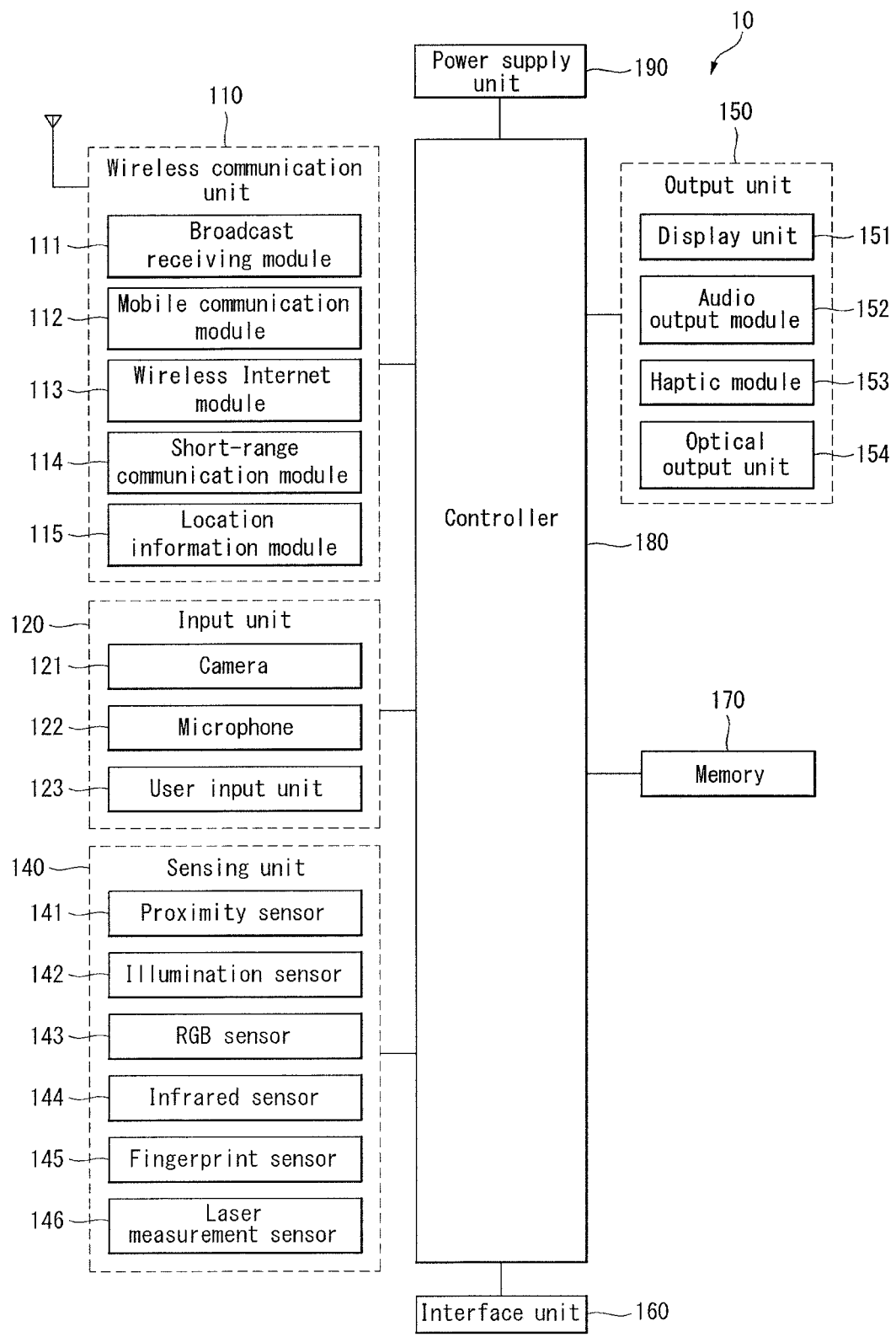
FIG. 22 is a block diagram illustrating a mobile terminal according to an embodiment of the disclosure.

FIG. 22 is a block diagram illustrating a mobile terminal according to an embodiment of the disclosure.

Referring to FIG. 22, a mobile terminal 10 may include a wireless communication unit 110, an input unit 120, a sensing unit 140, an output unit 150, an interface unit 160, a memory 170, a controller 180, a power supply unit 190, and the like. It is understood that implementing all the components illustrated in FIG. 22 is not a requirement for the mobile terminal, and that more or fewer components may be alternatively implemented.

More specifically, the wireless communication unit 110 may include one or more modules which permit wireless communications between the mobile terminal 10 and a wireless communication system, between the mobile terminal 10 and another mobile terminal 10, or between the mobile terminal 10 and an external server. Further, the wireless communication unit 110 may include one or more modules which connect the mobile terminal 10 to one or more networks.

The wireless communication unit 110 may include at least one of a broadcast receiving module 111, a mobile communication module 112, a wireless Internet module 113, a short-range communication module 114, or a location information module 115.

The input unit 120 may include a camera 121 which is one type of an image input unit for inputting an image signal, a microphone 122 which is one type of an audio input unit for inputting an audio signal, and a user input unit 123 (e.g., touch key, push key, etc.) for allowing a user to input information. Audio data or image data obtained by the input unit 120 may be analyzed and processed by user control commands.

The sensing unit 140 may include one or more sensors for sensing at least one of internal information of the mobile terminal, information about a surrounding environment of the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor 143, an infrared (IR) sensor 144, a fingerprint sensor 145, a laser measurement sensor 146, a ultrasonic sensor, an optical sensor (e.g., camera 121), a microphone 122, a battery gauge, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.). The mobile terminal disclosed in the present specification may be configured to combine and utilize information obtained from two or more sensors of the sensing unit 140.

The output unit 150 may be configured to output various types of information associated with audio, video, tactile output, and the like. The output unit 150 may include at least one of a display unit 151, an audio output unit 152, a haptic module 153, or an optical output unit 154.

The display unit 151 may have an inter-layered structure or an integrated structure with a touch sensor in order to implement a touch screen. The touch screen may provide an output interface between the mobile terminal 10 and the user, as well as function as the user input unit 123 which provides an input interface between the mobile terminal 10 and the user. The display unit 151 may be called a display 151.

The interface unit 160 serves as an interface with various types of external devices that can be coupled to the mobile terminal 10. The interface unit 160 may include at least one of wired or wireless headset ports, external power supply ports, wired or wireless data ports, memory card ports, ports for connecting a device having an identification module, audio input/output (I/O) ports, video I/O ports, or earphone ports. In some cases, the mobile terminal 10 may perform assorted control functions associated with a connected external device, in response to the external device being connected to the interface unit 160.

The memory 170 stores data to support various functions of the mobile terminal 10. For instance, the memory 170 may be configured to store multiple application programs or applications executed in the mobile terminal 10, data or instructions for operations of the mobile terminal 10, and the like. At least some of these application programs may be downloaded from an external server via wireless communication. Other application programs may be installed within the mobile terminal 10 at time of manufacturing or shipping, which is typically the case for basic functions (e.g., receiving a call, placing a call, receiving a message, sending a message, and the like) of the mobile terminal 10. It is common for application programs to be stored in the memory 170, installed in the mobile terminal 10, and executed by the controller 180 to perform an operation (or function) for the mobile terminal 10.

The controller 180 typically functions to control overall operation of the mobile terminal 10, in addition to the operations associated with the application programs. The controller 180 may provide or process suitable information or functions appropriate for the user by processing signals, data, information and the like, which are input or output by the components mentioned above, or activating application programs stored in the memory 170.

The controller 180 may control at least some of the components illustrated in FIG. 22 according to the execution of an application program that have been stored in the memory 170. In addition, the controller 180 may combine and operate at least two of the components included in the mobile terminal 10 for the execution of the application program.

The controller 180 may be implemented by a circuit board. A plurality of circuit boards may be provided. The circuit board may be a printed circuit board (PCB) or a flexible printed circuit board (FPCB).

The power supply unit 190 may be configured to receive external power or provide internal power and supply power to the respective components included in the mobile terminal 10 under the control of the controller 180. The power supply unit 190 may include a battery, and the battery may be configured to be embedded in the device body, or configured to be detachable from the device body.

At least some of the above components may be combined with one another and operate, in order to implement the operation, the control, or the control method of the mobile terminal according to various embodiments described above. Further, the operation, the control, or the control method of the mobile terminal according to various embodiments may be implemented by an execution of at least one application program stored in the memory 170.

It should be understood that numerous other modifications and embodiments can be devised by those skilled in the art that will fall within the scope of the principles of this disclosure.

Some embodiments or other embodiments of the disclosure described above are not exclusive or distinct from each other. Some embodiments or other embodiments of the disclosure described above can be used together or combined in configuration or function.

The above detailed description is merely an example and is not to be considered as limiting the present disclosure. The scope of the present disclosure should be determined by rational interpretation of the appended claims, and all changes within the equivalent range of the present disclosure are included in the scope of the present disclosure.

The invention claimed is:

1. A mobile terminal comprising:
a first body including a first display;
a second body hinge-coupled to the first body, the second body including a second display; and
a controller configured to determine activated areas of the first display and the second display depending on an angle formed between the first body and the second body,
wherein the first display includes:
a first flat display positioned on one surface of the first body; and
a first curved display positioned on a side of the first body adjacent to a rotation axis of the first body and extended and curved from the first flat display,
wherein the second display includes:
a second flat display positioned on one surface of the second body; and
a second curved display positioned on a side of the second body adjacent to a rotation axis of the second body and extended and curved from the second flat display,
wherein at least a portion of the first and second curved displays is deactivated when an outer surface of the first curved display faces an outer surface of the second curved display, and
wherein when a rear surface of the first body faces a rear surface of the second body, the controller activates at least one of the first flat display and the second flat display and activates entire areas of the first and second curved displays.

2. The mobile terminal of claim 1, wherein when the first and second curved displays form a valley, areas of the first and second curved displays adjacent to the valley are in a deactivated state.

3. The mobile terminal of claim 1, further comprising a hinge assembly hinge-coupled to the first body and the second body.

4. The mobile terminal of claim 3, wherein the first body has a first axis coupled to the hinge assembly,
wherein the second body has a second axis coupled to the hinge assembly, and
wherein the first axis is parallel to the second axis.

5. The mobile terminal of claim 4, wherein the first axis and the second axis are differently located in the hinge assembly depending anon the angle formed between the first body and the second body.

6. The mobile terminal of claim 1, wherein the first curved display includes a first curved glass, a first semi-transparent deposition layer, and a first curved display panel that are sequentially stacked, and
wherein the second curved display includes a second curved glass, a second semi-transparent deposition layer, and a second curved display panel that are sequentially stacked.

7. The mobile terminal of claim 1, wherein the first curved display includes a first front area that is in contact with the first flat display, a first rear area adjacent to the second curved display, and a first middle area between the first front area and the first rear area, and
wherein the second curved display includes a second front area that is in contact with the second flat display, a second rear area adjacent to the first curved display, and a second middle area between the second front area and the second rear area.

8. The mobile terminal of claim 7, wherein when the first body and the second body are unfolded, the controller activates the first and second flat displays, the first and second front areas, and the first and second middle areas and deactivates the first and second rear areas.

9. The mobile terminal of claim 7, wherein when the first flat display is observed at the second flat display, the controller activates the first and second flat displays and the first and second front areas and deactivates the first and second rear areas and the first and second middle areas.

10. The mobile terminal of claim 1, further comprising:
a first earphone jack disposed on one side of the first body; and
a second earphone jack disposed on one side of the second body.

11. The mobile terminal of claim 10, wherein the controller is configured to output a first content to the first display and the first earphone jack and output a second content to the second display and the second earphone jack.

12. The mobile terminal of claim 11, wherein the first content includes at least one of an audio file, a video file, a streaming, a message reception notification, a call reception notification, an email reception notification, a voice call, and a video call, and wherein the second content includes at least one of an audio file, a video file, and a streaming.

13. The mobile terminal of claim 1, wherein the first curved display forms one body with the first flat display, and wherein the second curved display forms one body with the second flat display.

14. The mobile terminal of claim 1, wherein the second body is lighter than the first body.

15. The mobile terminal of claim 1, wherein the first curved display or the second curved display displays at least one icon (IC).

* * * * *